United States Patent
Wu et al.

(10) Patent No.: US 12,284,696 B2
(45) Date of Patent: Apr. 22, 2025

(54) METHOD AND APPARATUS FOR PERFORMING SIDELINK COMMUNICATION IN A COMMUNICATION SYSTEM

(71) Applicant: LENOVO (BEIJING) LIMITED, Beijing (CN)

(72) Inventors: Lianhai Wu, Beijing (CN); Zhennian Sun, Beijing (CN); Jing Han, Beijing (CN); Haiming Wang, Beijing (CN); Xiaodong Yu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 434 days.

(21) Appl. No.: 17/632,905

(22) PCT Filed: Aug. 5, 2019

(86) PCT No.: PCT/CN2019/099272
§ 371 (c)(1),
(2) Date: Feb. 4, 2022

(87) PCT Pub. No.: WO2021/022443
PCT Pub. Date: Feb. 11, 2021

(65) Prior Publication Data
US 2022/0279609 A1    Sep. 1, 2022

(51) Int. Cl.
*H04W 76/14*     (2018.01)
*H04W 92/18*     (2009.01)
*H04W 88/04*     (2009.01)

(52) U.S. Cl.
CPC .......... *H04W 76/14* (2018.02); *H04W 88/04* (2013.01); *H04W 92/18* (2013.01)

(58) Field of Classification Search
CPC ...... H04W 76/14; H04W 88/04; H04W 92/18
See application file for complete search history.

(56) References Cited

U.S. PATENT DOCUMENTS

| | | | |
|---|---|---|---|
| 2015/0257187 A1* | 9/2015 | Kwon | H04W 72/04 370/329 |
| 2018/0054755 A1 | 2/2018 | Lee et al. | |

(Continued)

FOREIGN PATENT DOCUMENTS

| | | |
|---|---|---|
| CN | 101192873 A | 6/2008 |
| CN | 107211297 A | 9/2017 |

(Continued)

OTHER PUBLICATIONS

International Searching Authority, "Written Opinion of the International Searching Authority," PCT/CN2019/099272, Apr. 26, 2020, pp. 1-4.

(Continued)

*Primary Examiner* — Farid Seyedvosoghi
(74) *Attorney, Agent, or Firm* — Kunzler Bean & Adamson

(57) ABSTRACT

The present disclosure relates to methods and apparatuses. According to some embodiments of the disclosure, a method of a first communication device includes: receiving a first connection request from a second communication device, wherein the first connection request may include a first indication indicating that a first logical channel between the first communication device and the second communication device is associated with a third communication device.

18 Claims, 15 Drawing Sheets

(56) References Cited

U.S. PATENT DOCUMENTS

2020/0029318 A1* 1/2020 Guo .................. H04W 76/14
2021/0337544 A1* 10/2021 Wang .................. H04W 4/06

FOREIGN PATENT DOCUMENTS

| CN | 107645710 A | 1/2018 |
|---|---|---|
| CN | 107666686 A | 2/2018 |
| WO | 2018208114 A1 | 11/2018 |
| WO | 2019136606 A1 | 7/2019 |

OTHER PUBLICATIONS

Nokia et al., "Initial View on Support of unicast, groupcast and broadcast", 3GPP TSG RAN WG1 Meeting #94 R1-1809044, Aug. 20-24, 2018, pp. 1-5.

3GPP, 3rd Generation Partnership Project; Technical Specification Group Radio Access Network; Evolved Universal Terrestrial Radio Access (E-UTRA); Multiplexing and channel coding (Release 15), 3GPP TS 36.212 V15.6.0 (Jun. 2019), pp. 1-246, France.

3GPP, 3rd Generation Partnership Project; Technical Specification Group Radio Access Network; Evolved Universal Terrestrial Radio Access (E-UTRA); Medium Access Control (MAC) protocol specification (Release 15); 3GPP TS 36.321, V15.6.0 (Jun. 2019), pp. 1-133, France.

3GPP, 3rd Generation Partnership Project; Technical Specification Group Radio Access Network; Evolved Universal Terrestrial Radio Access Network (E-UTRA) and Evolved Universal Terrestrial Radio Access Network (E-UTRAN); Overall description; Stage 2 (Release 13), 3GPP TS 36.300 V13.13.0 (Mar. 2019), pp. 1-313, France.

* cited by examiner

METHOD AND APPARATUS FOR PERFORMING SIDELINK COMMUNICATION IN A COMMUNICATION SYSTEM

TECHNICAL FIELD

The present disclosure generally relates to wireless communication technology, and more particularly to sidelink communication in a wireless communication system.

BACKGROUND

In a wireless communication system, a communication device (e.g., User Equipment (UE)) may communicate with another communication device via a data path supported by an operator's network, e.g., a cellular or a Wi-Fi network infrastructure. The data path supported by the operator network may include a Base Station (BS) and multiple gateways.

In sidelink communications, communication devices, which are relatively close to each other, may communicate with one another directly via a sidelink (SL), rather than being linked through the BS. The term "SL" may refer to a direct radio link established for communicating among devices, e.g., UEs, as opposed to communicating via the cellular infrastructure (uplink and downlink) as discussed above. The "SL" may also be referred to as a sidelink communication link. The sidelink communication link may be used in any suitable telecommunication network in accordance with various standards.

Sidelink communication may provide various advantages, for example, a relatively high transfer rate, a relatively low delay, etc. Moreover, during the sidelink communication, traffic concentrated at a base station can be distributed. Furthermore, a UE supporting sidelink communication may function as a relay node to extend the coverage of a base station.

There is a need for efficiently performing sidelink communication in a communication system.

SUMMARY OF THE DISCLOSURE

An embodiment of the present disclosure provides a method of a first communication device. The method may include receiving a first connection request from a second communication device, wherein the first connection request may include a first indication indicating that a first logical channel between the first communication device and the second communication device is associated with a third communication device.

In an embodiment of the present application, the method may include transmitting, to the third communication device, a second connection request, wherein the second connection request may include a second indication indicating that a second logical channel between the first communication device and the third communication device is associated with the second communication device.

In an embodiment of the present application, the method may include receiving a first data corresponding to the first logical channel from the second communication device; and determining that a destination communication device of the first data is the third communication device based on the first indication. The first data may include first sidelink control information. The first sidelink control information may include a destination field indicating an identity of a relay communication device. The method may include determining discarding or relaying the first data based on the destination field of the first sidelink control information; and relaying the first data when the destination field of the first sidelink control information indicates the identity of the first communication device. The method may include decoding the first data into a Medium Access Control (MAC) Protocol Data Unit (PDU) when the destination field of the first sidelink control information indicates the identity of the first communication device, wherein a header of the MAC PDU may include a destination field indicating the identity of the relay communication device.

In an embodiment of the present application, the step of determining discarding or relaying the first data may include determining discarding or relaying the first data based on the destination field of the header of the MAC PDU. The step of relaying the first data may include relaying the first data to the destination communication device when the destination field of the header of the MAC PDU indicates the identity of the first communication device.

In an embodiment of the present application, the destination field of the first sidelink control information may include a part of the identity of the relay communication device, and the destination field of the header of the MAC PDU may include the remaining part of the identity of the relay communication device.

In an embodiment of the present application, the method may include transmitting a second data associated with the first data to the destination communication device when the destination communication device is not the first communication device.

In an embodiment of the present application, the step of transmitting the second data may include multiplexing the first data and a third data into the second data, wherein the first data and the third data are received from different logical channels, and the destination communication device of the third data is the same as the destination communication device of the first data.

In another embodiment of the present application, the step of transmitting the second data may include encoding the first data into a MAC PDU, wherein a header of the MAC PDU may include a source field indicating an identity of the first communication device; and encoding the MAC PDU into the second data. The second data may include second sidelink control information. The second sidelink control information may include a source field indicating the identity of the first communication device. The source field of the second sidelink control information may include a part of the identity of the first communication device. The source field of the header of the MAC PDU may include the remaining part of the identity of the first communication device.

Another embodiment of the present disclosure provides a method of a first communication device. The method may include receiving a first connection request from a second communication device, wherein the first connection request may include an indication of at least one destination communication device. The method may include receiving a first data from the second communication device; and decoding the first data into a first MAC PDU, wherein a header of the first MAC PDU may include a destination field indicating an identity of a destination communication device. The method may include transmitting a second data associated with the first data to the destination communication device when the destination communication device is one of the at least one destination communication device.

In an embodiment of the present application, transmitting the second data to the destination communication device may include encoding the first data into a second MAC PDU, wherein a header of the second MAC PDU may include a source field indicating an identity of the second communication device; and encoding the second MAC PDU into the second data.

In an embodiment of the present application, the second data may include a sidelink control information. The sidelink control information may include a source field indicating the identity of the first communication device. The source field of the sidelink control information may include at least a part of the identity of the first communication device.

Yet another embodiment of the present disclosure provides a method of a first communication device. The method may include receiving a first data from a second communication device, wherein the first data may include first sidelink control information, and the first sidelink control information may include a destination field indicating an identity of the first communication device.

In an embodiment of the present application, the method may include decoding the first data into a first MAC PDU, wherein the first MAC PDU may include at least one MAC sub-header and at least one MAC Service Data Unit (SDU), each MAC sub-header of the at least one MAC sub-header corresponds to a respective one of the at least one MAC SDU, and each MAC sub-header may include a source field and a destination field; and wherein the source field indicates an identity of a source communication device of a corresponding MAC SDU, and the destination field indicates an identity of a destination communication device of the corresponding MAC SDU. In an embodiment of the present application, the source field may include at least a part of the identity of the source communication device. The destination field may include at least a part of the identity of the destination communication device. In another embodiment of the present application, the first MAC PDU may include a first MAC SDU and a second MAC SDU. The destination communication device of the first MAC SDU is different from the destination communication device of the second MAC SDU. In yet another embodiment of the present application, the first MAC PDU may include a first MAC SDU. The method further may include transmitting a second data associated with the first data to the destination communication device of the first MAC SDU when the destination communication device of the first MAC SDU is not the first communication device.

In an embodiment of the present application, the step of transmitting the second data may include multiplexing the first data and a third data into the second data, wherein the first data and the third data are received from different logical channels, and the destination communication device of the third data is the same as the destination communication device of the first MAC SDU. The step of multiplexing the first data and the third data may include: encoding the first data into a second MAC SDU of a second MAC PDU, wherein a second MAC sub-header corresponding to the second MAC SDU may include a source field indicating an identity of a source communication device of the first data and a destination field indicating an identity of a destination communication device of the first data; and encoding the third data into a third MAC SDU of the second MAC PDU, wherein a third MAC sub-header corresponding to the second MAC SDU may include a source field indicating an identity of a source communication device of the third data and a destination field indicating an identity of the destination communication device of the first data. The source communication device of the first data is different from the source communication device of the third data.

In another embodiment of the present application, the second data may include second sidelink control information, and the second sidelink control information may include a source field indicating the identity of the first communication device.

In another embodiment of the present application, the method may include decoding the first data into a first MAC PDU, wherein the first MAC PDU may include a first MAC header including a destination field indicating the identity of the first communication device.

In an embodiment of the present application, the destination field of the first sidelink control information may include a part of the identity of the first communication device, and the destination field of the first MAC header may include the remaining part of the identity of the first communication device.

In another embodiment of the present application, the method may include decoding the first MAC PDU into a first Adaptation (ADAP) PDU, wherein a first ADAP header of the first ADAP PDU may include a source field indicating an identity of the second communication device and a destination field indicating an identity of a destination communication device. The method may include transmitting a second data associated with the first data to the destination communication device when the destination communication device is not the first communication device. The step of transmitting the second data may include multiplexing the first data and a third data into the second data, wherein the destination communication device of the third data is the same as the destination communication device of the first ADAP PDU. The step of multiplexing the first data and the third data may include encoding the first data into a second ADAP PDU, wherein a second ADAP header of the second ADAP PDU may include a source field indicating an identity of the second communication device and a destination field indicating an identity of the destination communication device; and encoding the third data into a third ADAP PDU, wherein a third ADAP header of the third ADAP PDU may include a source field indicating an identity of a third communication device and a destination field indicating an identity of the destination communication device.

In an embodiment of the present application, the third communication device is different from the second communication device.

In another embodiment of the present application, the step of multiplexing the first data and the third data may include encoding the second ADAP PDU and the third ADAP PDU into a second MAC PDU, wherein a header of the second MAC PDU may include a source field indicating an identity of the first communication device. The step of transmitting the second data may include encoding the second MAC PDU into the second data, wherein the second data may include second sidelink control information, and the second sidelink control information may include a source field indicating the identity of the first communication device. The source field of the second sidelink control information may include at least a part the identity of the first communication device.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1A:
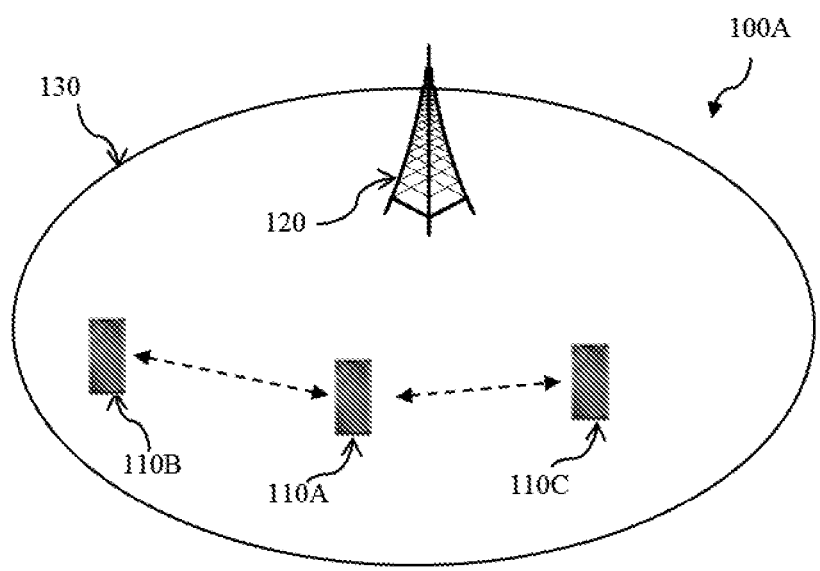
FIG. 1A illustrates a schematic wireless communication system according to some embodiments of the present disclosure.

FIG. 1A illustrates a schematic wireless communication system 100A according to some embodiments of the present disclosure.

Referring to FIG. 1A, a wireless communication system 100A may include a base station (e.g., BS 120) and some UEs (e.g., UE 110A, UE 110B, and UE 110C). Although, for simplicity, merely one BS 120 and three UEs are illustrated in FIG. 1, it is contemplated that wireless communication system 100A may also include more BSs 120 and more or fewer UEs in and outside of the coverage of the BSs 120 in some other embodiments of the present disclosure.

The UEs and the base station may support communication based on, for example, 3G, Long-Term Evolution (LTE), LTE-Advanced (LTE-A), New Radio (NR), or other suitable protocol(s). For example, the BS 120 may include an eNB or a gNB. The UE 110A may include, for example, but is not limited to, a computing device, a wearable device, a mobile device, an IoT device, etc. The UE 110B and UE 110C may include a device that is the same or similar to the UE 110A. The UE 110B and UE 110C may also include a device different from the UE 110A. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100A, UE 110A, UE 110B, and UE 110C are within the coverage of the BS 120 (i.e., in-coverage), which may not be a specific BS 120 shown in FIG. 1A and may be any one of the BSs 120 in a wireless communication system. For example, in the case that a wireless communication system includes two BSs 120 with a UE 110D (not shown in FIG. 1), the UE 110D being within the coverage of a BS 120 in the wireless communication system means that the UE 110D being within the coverage of either of the two BSs 120; and the UE 110D being outside the coverage of a BS 120 in the wireless communication system means that the UE 110D being outside of the coverage of both BSs 120.

The UE 110A, UE 110B, and UE 110C may communicate with the BS 120 via, for example, a Uu link (not illustrated in FIG. 1A), and may communicate with each other via a sidelink (denoted by dotted arrow in FIG. 1A), for example, a PC5 interface as defined in 3GPP specification TS 23.303. During a sidelink communication, one UE may act as a relay node (hereinafter referred to as "Relay UE") relaying data from a transmitting UE (hereinafter referred to as "Tx UE") to a receiving UE (hereinafter referred to as "Rx UE"). For example, referring to FIG. 1A, a Tx UE (e.g., the UE 110B) may transmit data to an Rx UE (e.g., the UE 110C) through a Relay UE (e.g., the UE 110A).

Figure 1B:
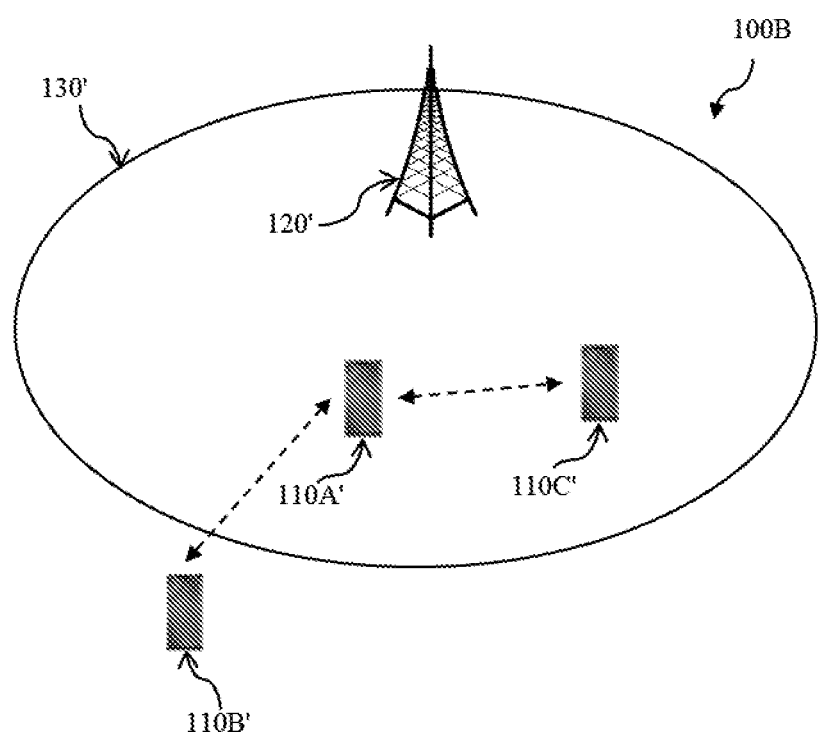
FIG. 1B illustrates a schematic wireless communication system according to some embodiments of the present disclosure.

FIG. 1B illustrates a schematic wireless communication system 100B according to some embodiments of the present disclosure.

As shown in FIG. 1B, the wireless communication system 100B may include a base station (e.g., BS 120') and some UEs (e.g., UE 110A', UE 110B', and UE 110C'). The above descriptions regarding the BS 120, UE 110A, UE 110B, and UE 110C in FIG. 1A can also be applied to the wireless communication system 100B in FIG. 1B except that the UE 110A' and UE 110C' are within the coverage of the BS 120' (i.e., in-coverage) and the UE 110B' is outside of the coverage of the BS 120' (i.e., out-of-coverage). In this scenario, since the UE 110B' is outside of the coverage of the BS 120', it cannot communicate with the BS 120' via a Uu link. On the other hand, the UE 110A' and UE 110C' may communicate with the BS 120' via a Uu link (not illustrated in FIG. 1B). The UE 110A' and UE 110C' may also communicate with each other and with the UE 110B' through a sidelink (denoted by dotted arrow in FIG. 1A), for example, a PC5 interface as defined in 3GPP specification TS 23.303. During a sidelink communication, a Tx UE (e.g., the UE 110B') may transmit data to an Rx UE (e.g., the UE 110C') through a Relay UE (e.g., the UE 110A').

Although FIG. 1B merely shows that the UE 110B' is outside of the coverage of the BS 120' for simplicity, it is contemplated that one or both of the UE 110A' and UE 110C' may also be outside of the coverage of the BS 120' in some other embodiments of the present disclosure.

FIGS. 2A-2D illustrate example block diagrams of a protocol stack for layer 2 relaying according to embodiments of the present disclosure.

Figure 2A:
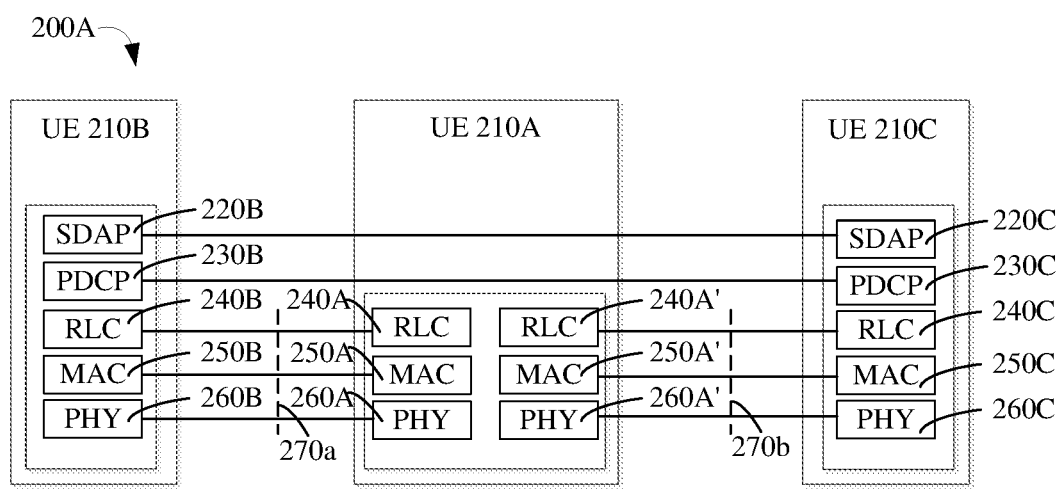
FIG. 2A illustrates an example block diagram of a protocol stack for relaying according to some embodiments of the present disclosure.

FIG. 2A illustrates an example block diagram of a User Plane (UP) protocol stack 200A at a Tx UE (e.g., UE 210B), a Relay UE (e.g., UE 210A), and an Rx UE (e.g., UE 210C) to support layer 2 relaying according to some embodiments of the present disclosure. Tx UE 210B may connect to Relay UE 210A via a sidelink (e.g., a PC5 interface 270a). The Relay UE 210A may connect to Rx UE 210C via a sidelink (e.g., a PC5 interface 270b).

The data flow of the protocol stack 200A is described below.

As illustrated in FIG. 2A, the UE 210B protocol stack may include a Service Data Adaptation Protocol (SDAP) layer 220B, a Packet Data Convergence Protocol (PDCP) layer 230B, a Radio Link Control (RLC) layer 240B, a Medium Access Control (MAC) layer 250B, and a Physical (PHY) layer 260B.

At the UE 210B, a higher layer (e.g., Internet Protocol (IP) layer, which is not shown in FIG. 2A) may deliver IP Packets to the SDAP layer 220B. The SDAP layer 220B may add SDAP headers to SDAP SDUs received from the higher layer to form SDAP Packet Data Units (PDUs), and may deliver the SDAP PDUs to a lower layer (e.g., the PDCP layer 230B). The PDCP layer 230B may add PDCP headers to PDCP SDUs received from the SDAP layer 220B, and may deliver PDCP PDUs to a lower layer (e.g., the RLC layer 240B). The RLC layer 240B may add RLC headers to RLC SDUs received from the PDCP layer 230B, and may deliver RLC PDUs to a lower layer (e.g., the MAC layer 250B). The MAC layer 250B may add MAC headers to MAC SDUs received from the RLC layer 240B to form MAC PDUs, and may deliver the MAC PDUs to a lower layer (e.g., the PHY layer 260B). The PHY layer 260B may add information such as Cyclic Redundancy Check (CRC) information to Transport Blocks (TBs) corresponding to the MAC PDUs for transmission. Control information, such as sidelink control information, corresponding to the TBs may also be transmitted.

The UE 210A may include a receiving protocol stack and a transmitting protocol stack. The receiving protocol stack of the UE 210A may include a RLC layer 240A, a MAC layer 250A, and a PHY layer 260A. The transmitting protocol stack of the UE 210A may include a RLC layer 240A', a MAC layer 250A', and a PHY layer 260A'.

The UE 210A may receive data from the UE 210B. For example, at the receiving protocol stack of the UE 210A, the PHY layer 260A may receive and decode data from the UE 210B, and may deliver TBs decoded from the data to an upper layer (e.g., the MAC layer 250A). The MAC layer 250A may decode MAC PDUs corresponding to the TBs, and may deliver MAC SDUs to an upper layer (e.g., the RLC layer 240A). The RLC layer 240A may decode RLC PDUs received from the MAC layer 250A, and may deliver the decoded data (e.g., RLC SUDs) to the transmitting protocol stack of the UE 210A.

The transmitting protocol stack of the UE 210A may receive decoded data from the receiving protocol stack of the UE 210A. For example, the RLC layer 240A' may receive decoded data from the receiving protocol stack of the UE 210A, and may encode it as RLC PDUs to deliver to a lower layer (e.g., MAC layer 250A'). The MAC layer 250A' may encode MAC SDUs from the RLC layer 240A' as MAC PDUs to deliver to a lower layer (e.g., the PHY layer 260A'). The PHY layer 260A' may add information such as CRC to the TBs corresponding to the MAC PDUs for transmitting to a destination device (e.g., the UE 210C). Control information, such as sidelink control information, corresponding to the TBs may also be transmitted.

Similar to the UE 210B, the UE 210C protocol stack may include a SDAP layer 220C, a PDCP layer 230C, a RLC layer 240C, a MAC layer 250C, and a PHY layer 260C.

The UE 210C may receive data from the UE 210A. For example, the PHY layer 260C may receive and decode data from the UE 210A, and may deliver decoded TBs to an upper layer (e.g., the MAC layer 250C). The MAC layer 250C may decode MAC PDUs corresponding to the TBs, and may deliver MAC SDUs to an upper layer (e.g., the RLC layer 240C). The RLC layer 240C may decode RLC PDUs and may deliver RLC SDUs to an upper layer (e.g., the PDCP layer 230C). The PDCP layer 230C may decode PDCP PDUs and may deliver PDCP SDUs to an upper layer (e.g., the SDAP layer 220C). The SDAP layer 220C may decode SDAP PDUs and may deliver SDAP SDUs to an upper layer (e.g., an IP layer, which is not shown in FIG. 2A).

Figure 2B:
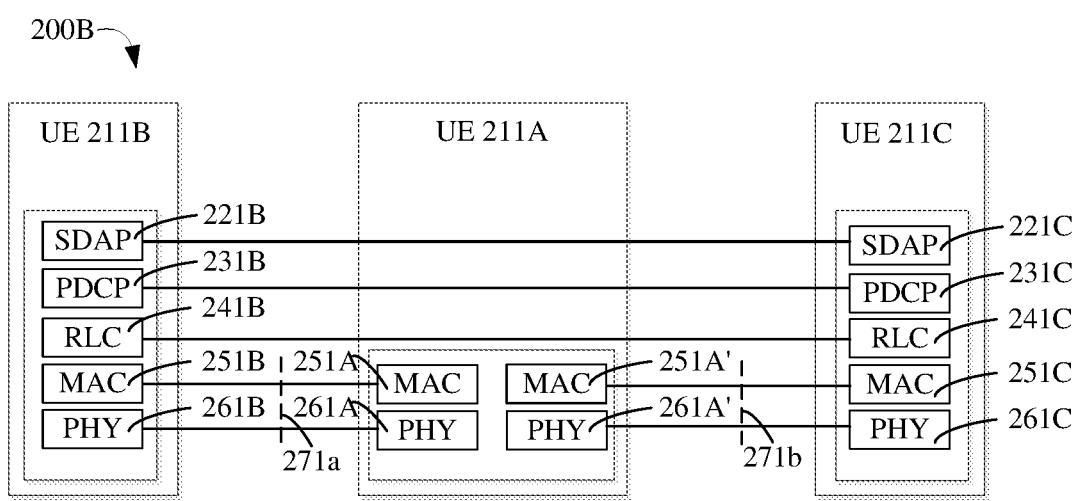
FIG. 2B illustrates an example block diagram of a protocol stack for relaying according to some embodiments of the present disclosure.

FIG. 2B illustrates an example block diagram of a UP protocol stack 200B at a Tx UE (e.g., UE 211B), a Relay UE (e.g., UE 211A), and an Rx UE (e.g., UE 211C) to support layer 2 relaying according to some embodiments of the present disclosure. Tx UE 211B may connect to Relay UE 211A via a sidelink (e.g., a PC5 interface 271a). The Relay UE 211A may connect to Rx UE 211C via a sidelink (e.g., a PC5 interface 271b).

As shown in FIG. 2B, the UE 211B protocol stack may include a SDAP layer 221B, a PDCP layer 231B, a RLC layer 241B, a MAC layer 251B, and a PHY layer 261B. The UE 211A may include a receiving protocol stack and a transmitting protocol stack. The receiving protocol stack of the UE 211A may include a MAC layer 251A and a PHY layer 261A. The transmitting protocol stack of the UE 211A may include a MAC layer 251A' and a PHY layer 261A'. The UE 211C protocol stack may include a SDAP layer 221C, a PDCP layer 231C, a RLC layer 241C, a MAC layer 251C, and a PHY layer 261C.

The above descriptions regarding the data flow of the protocol stack 200A in FIG. 2A can also be applied to the protocol stack 200B in FIG. 2B except that the receiving protocol stack and the transmitting protocol stack of the UE 211A do not include a RLC layer. In this scenario, the MAC layer 251A' may receive decoded data from the receiving protocol stack of the UE 211A, and may encode it as MAC PDUs to deliver to a lower layer (e.g., the PHY layer 261A'). The PHY layer 261A' may add information such as CRC to TBs corresponding to the MAC PDUs for transmitting to a destination device (e.g., the UE 211C). Control information, such as sidelink control information, corresponding to the TBs may also be transmitted.

Figure 2C:
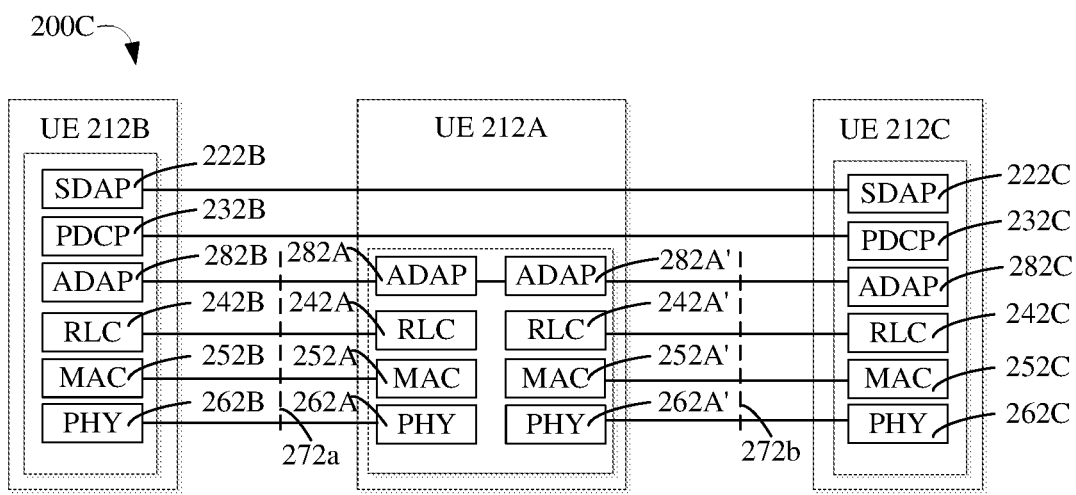
FIG. 2C illustrates an example block diagram of a protocol stack for relaying according to some embodiments of the present disclosure.

FIG. 2C illustrates an example block diagram of a UP protocol stack 200C at a Tx UE (e.g., UE 212B), a Relay UE (e.g., UE 212A), and an Rx UE (e.g., UE 212C) to support layer 2 relaying according to some embodiments of the present disclosure. Tx UE 212B may connect to Relay UE 212A via a sidelink (e.g., a PC5 interface 272a). The Relay UE 212A may connect to Rx UE 212C via a sidelink (e.g., a PC5 interface 272b).

As shown in FIG. 2C, the UE 212B protocol stack may include a SDAP layer 222B, a PDCP layer 232B, an Adaptation (ADAP) layer 282B, a RLC layer 242B, a MAC layer 252B, and a PHY layer 262B. The UE 212A may include a receiving protocol stack and a transmitting protocol stack. The receiving protocol stack of the UE 212A may include an ADAP layer 282A, a RLC layer 242A, a MAC layer 252A, and a PHY layer 262A. The transmitting protocol stack of the UE 212A may include an ADAP layer 282A', a RLC layer 242A', a MAC layer 252A', and a PHY layer 262A'. The UE 212C protocol stack may include a SDAP layer 222C, a PDCP layer 232C, an ADAP layer 282C, a RLC layer 242C, a MAC layer 252C, and a PHY layer 262C.

The above descriptions regarding the data flow of the protocol stack 200A in FIG. 2A can also be applied to the protocol stack 200C in FIG. 2C except that the protocol stacks of the UE 212A, UE 212B, and UE 212C include respective ADAP layers (e.g., ADAP layers 282A, 282A', 282B, and 282C) above the corresponding RLC layers (e.g., RLC layers 242A, 242A', 242B, and 242C). In this scenario, at the UE 212B, the PDCP layer 232B may deliver PDCP PDUs to the ADAP layer 282B, which may deliver ADAP PDUs to the RLC layer 242B. At the UE 212C, the RLC layer 242C may deliver RLC SDUs to the ADAP layer 282C, which may deliver ADAP SDUs to the PDCP layer 232C.

Similarly, at the receiving protocol of UE 212A, the ADAP layer 282A may receive ADAP PDUs from the RLC layer 242A, and may deliver the decoded data (e.g., ADAP SDUs) to the transmitting protocol stack of the UE 212A. At the transmitting protocol stack of the UE 212A, the ADAP layer 282A' may receive decoded data from the receiving protocol stack of the UE 212A, and may deliver ADAP PDUs to the RLC layer 242A'.

Figure 2D:
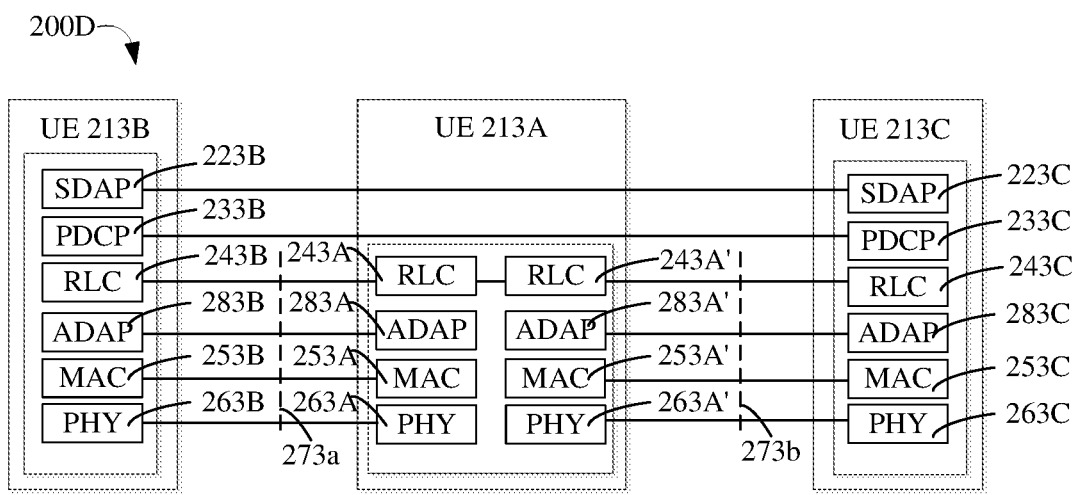
FIG. 2D illustrates an example block diagram of a protocol stack for relaying according to some embodiments of the present disclosure.

FIG. 2D illustrates an example block diagram of a UP protocol stack 200D at a Tx UE (e.g., UE 213B), a Relay UE (e.g., UE 213A), and an Rx UE (e.g., UE 213C) to support layer 2 relaying according to some embodiments of the present disclosure. Tx UE 213B may connect to Relay UE 213A via a sidelink (e.g., a PC5 interface 273a). The Relay UE 213A may connect to Rx UE 213C via a sidelink (e.g., a PC5 interface 273b).

As shown in FIG. 2D, the UE 213B protocol stack may include a SDAP layer 223B, a PDCP layer 233B, a RLC layer 243B, an ADAP layer 283B, a MAC layer 253B, and a PHY layer 263B. The UE 213A may include a receiving protocol stack and a transmitting protocol stack. The receiving protocol stack of the UE 213A may include a RLC layer 243A, an ADAP layer 283A, a MAC layer 253A, and a PHY layer 263A. The transmitting protocol stack of the UE 213A may include a RLC layer 243A', an ADAP layer 283A', a MAC layer 253A', and a PHY layer 263A'. The UE 213C protocol stack may include a SDAP layer 223C, a PDCP layer 233C, a RLC layer 243C, an ADAP layer 283C, a MAC layer 253C, and a PHY layer 263C.

The above descriptions regarding the data flow of the protocol stack 200C in FIG. 2C can also be applied to the protocol stack 200D in FIG. 2D except that the ADAP layers 283B, 283A, 283A', and 283C in FIG. 2D are below the corresponding RLC layers (e.g., RLC layers 243A, 243A', 243B, and 243C) and above the corresponding MAC layers (e.g., MAC layers 253A, 253A', 253B, and 253C).

In this scenario, at the UE 213B, the RLC layer 242B may deliver RLC PDUs to the ADAP layer 283B, which may deliver ADAP PDUs to the MAC layer 253B. At the UE 213C, the MAC layer 253C may deliver MAC SDUs to the ADAP layer 283C, which may deliver ADAP SDUs to the RLC layer 243C. Similarly, at the receiving protocol of UE 213A, the ADAP layer 283A may decode ADAP PDUs from the MAC layer 253A, and may deliver ADAP SDUs to the RLC layer 243A. At the transmitting protocol stack of the UE 213A, the ADAP layer 282A' may receive ADAP SDUs from the RLC layer 243A', and may deliver ADAP PDUs to the MAC layer 253A'.

Figure 3A:
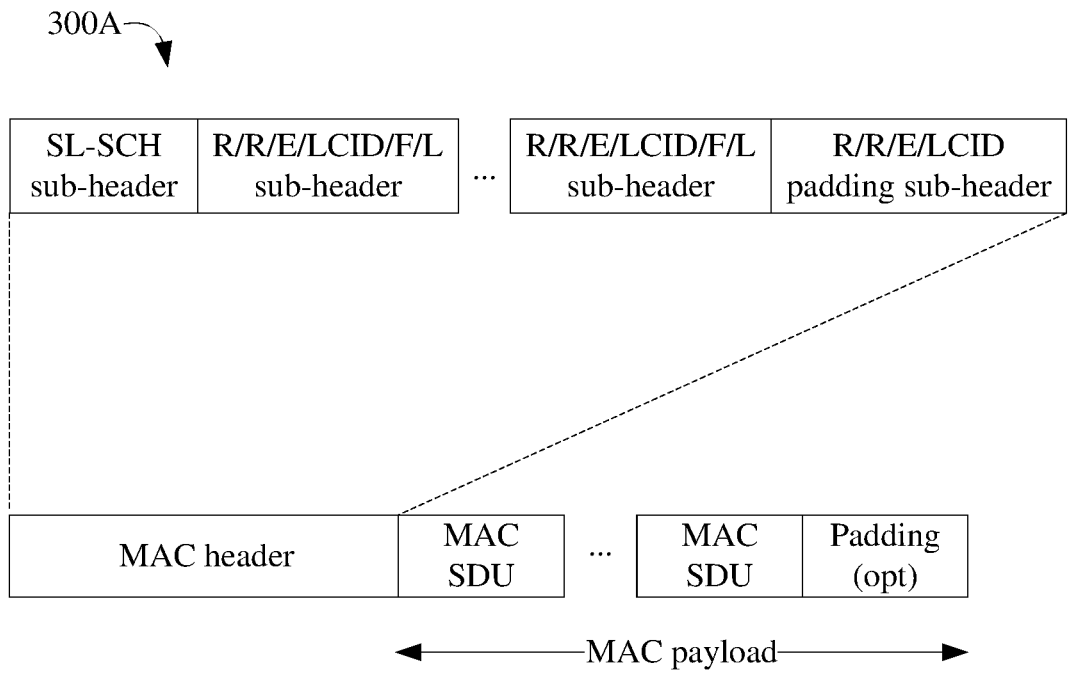
FIG. 3A illustrates an exemplary MAC PDU according to some embodiments of the present disclosure.
Figure 3B:
FIG. 3B illustrates an exemplary MAC PDU according to some embodiments of the present disclosure.

FIGS. 3A and 3B illustrate exemplary formats of MAC PDU according to embodiments of the present disclosure.

FIG. 3A illustrates an exemplary MAC PDU 300A structure according to some embodiments of the present disclosure. As shown in FIG. 3A, MAC PDU 300A structure may include a MAC header and at least one MAC SDU. In some embodiments, the MAC PDU 300A structure may include padding located, for example, at the end of the MAC PDU. The MAC header may include a Sidelink Shared Channel (SL-SCH) sub-header, and at least one MAC sub-header corresponding to the at least one MAC SDU. In some embodiments, the MAC header may include a padding sub-header corresponding to the padding located, for example, at the end of the MAC header. The at least one MAC SDU and the padding, if any, may be referred to as MAC payload.

A SL-SCH sub-header may include seven header fields V/R/R/R/R/SRC/DST. A MAC sub-header may include six header fields R/R/E/LCID/F/L, and a padding sub-header may include four fields R/R/E/LCID. The meanings of the above fields are listed below:

V: The MAC PDU format version number field may indicate which version of the SL-SCH sub-header is used. The V field may have 4 bits, and may be set to "0001", "0010", or "0011".

R: The Reserved field may be reserved for future use, and may have 1 bit setting to "0".

SRC: The Source ID field may indicate the identity of a source.

DST: The Destination ID field may indicate the identity of a destination.

E: The Extension field may indicate whether more fields are present in the MAC header or not, and may have 1 bit.

LCID: The Logical Channel ID (LCID) field may identify the logical channel instance of the corresponding MAC SDU or the type of the corresponding MAC control element or padding.

L: The Length field may indicate the length of the corresponding MAC SDU in bytes.

F: The Format field may indicate the size of the Length field. The F field may have 1 bit, and may be set to "0" to indicate that the size of the Length field is 8 bits, or may be set to "1" to indicate that the size of the Length field is 16 bits.

The specific definitions of the MAC header and the fields in the MAC header are defined in 3GPP specification TS 36.321 and TS 38.321.

FIG. 3B illustrates an exemplary MAC PDU 300B structure according to some embodiments of the present disclosure. The MAC PDU 300B structure may be referred to as an interleave format for MAC PDU.

As shown in FIG. 3B, MAC PDU 300B structure may include at least one MAC sub-header and at least one MAC SDU. Each MAC sub-header of the at least one MAC sub-header corresponds to a respective one of the at least one MAC SDU. For example, a MAC PDU may start with a MAC sub-header, which may be immediately followed by a corresponding MAC SDU. The MAC SDU may be immediately followed by another MAC sub-header, which may be immediately followed by another corresponding MAC SDU. In some embodiments, the MAC PDU 300B structure may include padding and a padding sub-header immediately followed by the padding located, for example, at the end of the MAC PDU. In some embodiments, the MAC PDU may start with a SL-SCH sub-header followed by a MAC sub-header and a MAC SDU in sequence.

In some embodiments of the present disclosure, the specific definitions of the MAC sub-header and MAC SDUs and the specific definitions of the padding, a padding sub-header, and SL-SCH sub-header (if any) in the MAC PDU 300B structure are the same as those described with respect to FIG. 3A.

In some embodiments of the present disclosure, the MAC sub-header may have a new structure, which will be described in detail in the following text in combination with the appended drawings.

Figure 4:
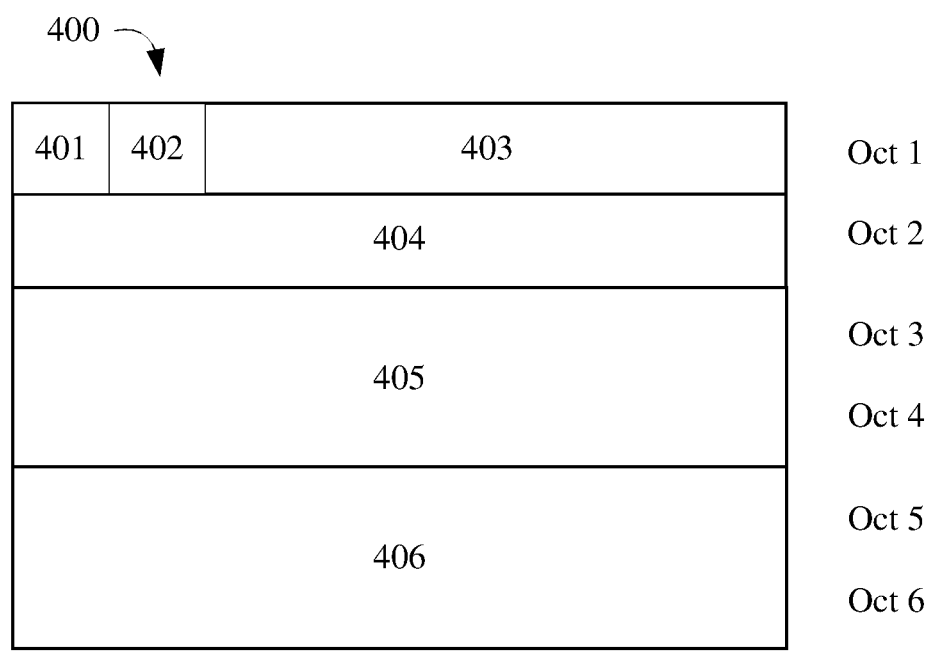
FIG. 4 illustrates an exemplary MAC sub-header according to some embodiments of the present disclosure.

FIG. 4 illustrates an exemplary MAC sub-header 400 structure according to some embodiments of the present disclosure. The MAC sub-header 400 structure may be applied to the MAC sub-header field shown in FIG. 3B.

As shown in FIG. 4, the MAC sub-header 400 structure can be octet aligned. The MAC sub-header 400 can include 6 bytes, which can be respectively referred to as "Oct 1," "Oct 2," "Oct 3," "Oct 4," "Oct 5," and "Oct 6" in FIG. 4. It is contemplated that the MAC sub-header 400 can have structure different from the structure as illustrated in FIG. 4. For example, the "Oct 1" as shown in FIG. 4 may include more or less bit(s) in accordance with some other embodiments of the present disclosure.

The MAC sub-header 400 structure may include fields 401, 402, 403, 404, 405, and 406. The fields 401, 402, 403, 404, 405, and 406 may be the R field, the F field, the LCID field, the L field, the SRC field, and the DST field, respectively. These fields may have the same definitions as the corresponding fields described above with respect to FIG. 3A.

For example, the field 405 may be the Source ID field, and may be used to indicate the identity of a source communicate device from which the data in a corresponding MAC SDU is transmitted. The field 406 may be the Destination ID field, and may be used to indicate the identity of a destination communicate device to which the data in a corresponding MAC SDU is transmitted.

Although FIG. 4 shows that the fields 401, 402, 403, 404, 405, and 406 respectively include 1 bit, 1 bit, 6 bits, 8 bits, 16 bits, and 16 bits for simplicity, it is contemplated that these field may respectively include more or fewer bits in some other embodiments of the present disclosure. For example, the fields 405 and 406 may include 24 bits.

During a discovery procedure, a communication device A may discover a communication device B, which may discover a communication device C. The communication device B may establish a sidelink communication with the communication device A, which may establish a sidelink communication with the communication device C. In this case, even if the communication device B may be distant from the communication device C, the communication device B can perform a sidelink communication with the communication device C via the communication device A. In this case, the communication device A may function as a relay node relaying data from the communication device B to the communication device C and vice versa. More details on the procedure of performing sidelink communication will be described in detail in the following text in combination with the appended drawings.

The following procedure may be applied to communication devices within the coverage of a base station as well as communication devices outside the coverage of a base station.

Figure 5A:
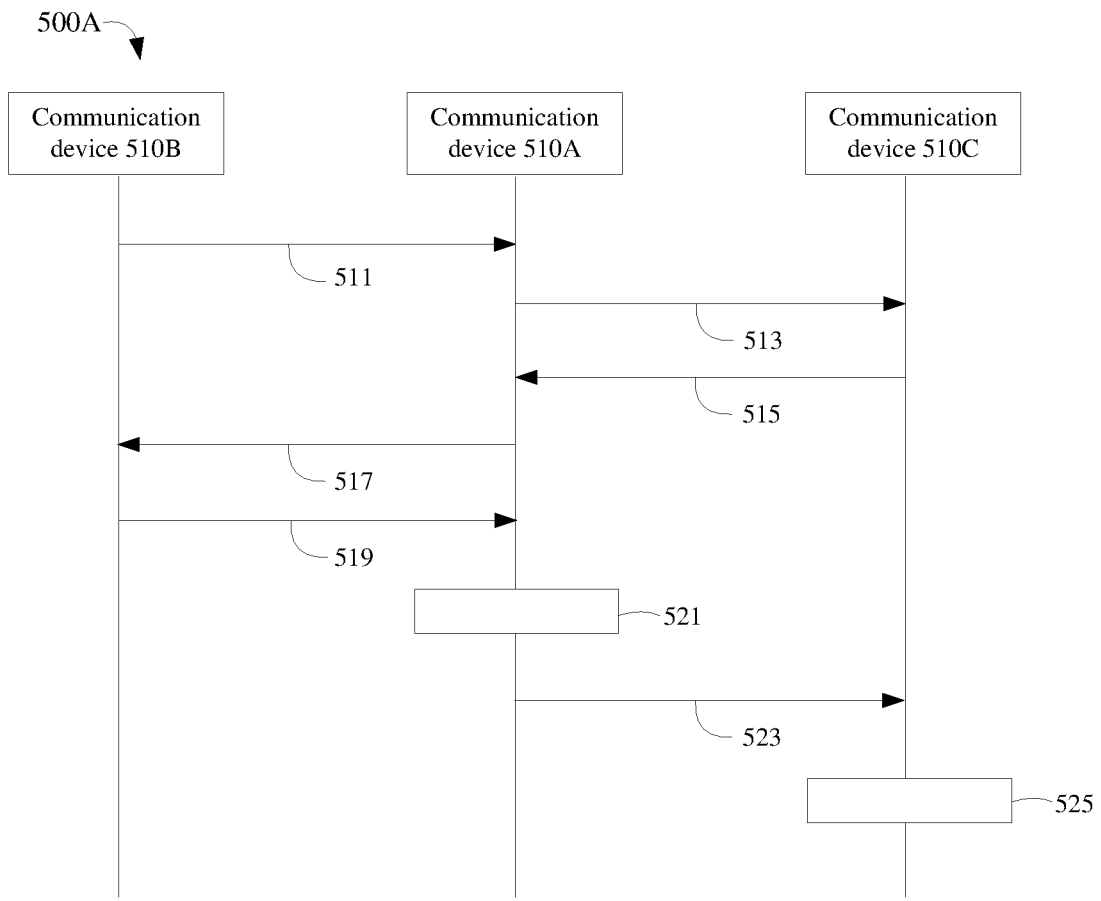
FIG. 5A illustrates a flow chart of an exemplary procedure of performing sidelink communication according to some embodiments of the present disclosure.

FIG. 5A illustrates a flow chart of an exemplary procedure 500A of performing sidelink communication according to some embodiments of the present disclosure.

In some examples, the communication device 510A may function as the communication device 110A in FIG. 1A, the communication device 110A' in FIG. 1B, the UE 210A in FIG. 2A, or the UE 211A in FIG. 2B. The communication device 510B may function as the communication device 110B in FIG. 1A, the communication device 110B' in FIG. 1B, the UE 210B in FIG. 2A, or the UE 211B in FIG. 2B. The communication device 510C may function as the communication device 110C in FIG. 1A, the communication device 110C' in FIG. 1B, the UE 210C in FIG. 2A, or the UE 211C in FIG. 2B.

During a discovery procedure, the communication device 510A may discover the communication device 510B, which may discover a communication device 510C. As mentioned above, even if the communication device 510B may be distant from the communication device 510C, the communication device 510B can still establish a sidelink communication with the communication device 510C via the communication device 510A. After establishing such communication, the communication device 510B may transmit data to the communication device 510C via the communication device 510A. In this case, the communication device 510B may be the source communication device of the data, the communication device 510C may be the destination communication device of the data, and the communication device 510A may be a relay communication device.

The exemplary procedure 500A shows a procedure of a source communication device (e.g., the communication device 510B) communicating with a destination communication device (e.g., the communication device 510C) via a relay communication device (e.g., the communication device 510A).

Referring to FIG. 5A, in operation 511, the communication device 510B may transmit a connection request to the communication device 510A. In some embodiments of the present disclosure, the connection request to the communication device 510A may be transmitted via an Access Stratum (AS) layer message. In operation 513, the communication device 510A may transmit a connection request to the communication device 510C. In some embodiments of the present disclosure, the connection request to the communication device 510C may be transmitted via an AS layer message.

In some embodiments of the present disclosure, the connection request between two communication devices may include an indication indicating an association between a logical channel and another different communication device. In some embodiments, such association may be configured by a base station. In some other embodiments, such association may be preconfigured.

For example, in some embodiments of the present disclosure, the connection request from a source communication device (e.g., the communication device 510B) to a relay communication device (e.g., the communication device 510A) may include an indication indicating that a logical channel between the source communication device (e.g., the communication device 510B) and the relay communication device (e.g., the communication device 510A) is associated with a destination communication device (e.g., the communication device 510C). In this way, at least a part of logical channels between a source communication device (e.g., the communication device 510B) and a relay communication device (e.g., the communication device 510A) may be configured to be associated with respective destination communication devices. With such indication, a relay communication device may identify the destination communication device of data to be transmitted on the logical channel.

In some embodiments, the source communication device may be located in the coverage of a base station. In these embodiments, the association between the logical channel and the destination device may be configured by a base station, or may be preconfigured at the source communication device. In some embodiments, the source communication device may be located outside the coverage of a base station. In these embodiments, the association between the logical channel and the destination device may be preconfigured at the source communication device.

In some embodiments of the present disclosure, the connection request from a relay communication device (e.g., the communication device 510A) to a destination device (e.g., the communication device 510C) may include an indication indicating that a logical channel between the relay communication device (e.g., the communication device 510A) and the destination communication device (e.g., the communication device 510C) is associated with a source communication device (e.g., the communication device 510B). In this way, at least a part of logical channels between a relay communication device (e.g., the communication device 510A) and a destination communication device (e.g., the communication device 510C) may be configured to be associated with respective source communication devices. With such indication, a destination communication device may identify the source communication device of data to be received on the logical channel.

In some embodiments, a relay communication device may be located in the coverage of a base station. In these embodiments, the association between the logical channel and the source device may be configured by a base station, or may be preconfigured at the relay communication device. In some embodiments, the relay communication device may be located outside the coverage of a base station. In these embodiments, the association between the logical channel and the source device may be preconfigured at the relay communication device.

Still referring to FIG. 5A, in operation 515, the communication device 510C may transmit an acknowledgement to the communication device 510A in response to receiving the connection request from the communication device 510A. In operation 517, the communication device 510A may transmit an acknowledgement to the communication device 510B in response to receiving the acknowledgement from the communication device 510C.

After the above procedure, the communication device 510B and the communication device 510C may communicate with each other via the communication device 510A. In some embodiments of the present disclosure, a communication device 510D (not shown in FIG. 5A) may establish a sidelink communicate with the communication device 510C or a different communication device (e.g., a communication device 511E, which is not shown in FIG. 5A) via the communication device 510A by performing operations similar to operations 511-517.

After establishing a communication with the communication device 510C via the communication device 510A, the communication device 510B may transmit data to the communication device 510C via the communication device 510A.

The communication device 510B may encode the data to be transmitted to the communication device 514C via the communication device 514A. For example, in some embodiments of the present disclosure, at a MAC layer, the communication device 510B may encode SDUs from an upper layer (e.g., RLC layer) into a MAC PDU. The MAC PDU may employ the MAC PDU 300A structure in FIG. 3A or the MAC PDU 300B structure in FIG. 3B.

In some embodiments of the present disclosure, a header of the MAC PDU may include a destination field indicating the identity of a relay communication device (e.g., the communication device 510A). In some embodiments, the destination field may include at least a part of the identity of the relay communication device. The header of the MAC PDU may include a source field indicating the identity of a source communication device (e.g., the communication device 510B) of the data. In some embodiments, the source field may include at least a part of the identity of the source communication device. The header of the MAC PDU may be a SL-SCH sub-header as described above with respect to FIGS. 3A and 3B.

In some embodiments of the present disclosure, the communication device 510B may deliver the MAC PDU to a PHY layer. The PHY layer may receive TBs corresponding to the MAC PDU. In some embodiments, sidelink control information may be transmitted with the TBs. For example, the communication device 510B may transmit the sidelink control information before the transmission of the TBs. The sidelink control information may indicate the time-frequency location of a corresponding sidelink data transmission (e.g., the transmission of the TBs).

In some embodiments, the sidelink control information may indicate an identity of a relay communication device (e.g., the communication device 510A). For example, the sidelink control information may include a destination field. The destination field of the sidelink control information may include at least a part of the identity of the relay communication device, which can be combined with the destination field of the header of the MAC PDU to form the complete identity of the relay communication device. For example, the identity of a relay communication device may be a 24-bit UE ID. The sidelink control information may include 8 bits or all 24 bits of the 24-bit UE ID. The destination field of the header of the MAC PDU may include the remaining 16 bits or all 24 bits of the 24-bit UE ID.

In some embodiments, the sidelink control information may include a source field indicating an identity of the source communication device (e.g., the communication device 510B). The source field of the sidelink control information may include at least a part of the identity of the source communication device.

After the above encoding processes, the communication device 510B may transmit, in operation 519, encoded data to the communication device 510A. The communication device 510A may receive the data on a logical channel between the communication device 510A and the communication device 510B.

In operation 521, the communication device 510A may decode the received data. For example, the communication device 510A may determine discarding, relaying, or accepting the data without relaying. The communication device 510A accepting the data means that the data is not relayed by the communication device 510A.

In some embodiments of the present disclosure, the data may include sidelink control information. The communication device 510A may determine discarding the data or delivering the data to an upper layer (e.g., a MAC layer) based on the sidelink control information. For example, the communication device 510A may determine whether the sidelink control information indicates the identity of the communication device 510A. When it is determined that the sidelink control information indicates the identity of the communication device 510A, the communication device 510A may deliver the data to a MAC layer to determine whether to relay the data to a destination communication device. Otherwise, when it is determined that the sidelink control information does not indicate the identity of the communication device 510A, the communication device 510A may discard the received data.

In some embodiments of the present disclosure, the communication device 510A may decode the received data into a MAC PDU. For example, when it is determined that the sidelink control information indicates the identity of the communication device 510A, the communication device 510A may decode the received data into a MAC PDU. The communication device 510A may determine discarding the data or delivering the data to an upper layer (e.g., a RLC layer) based on a header of the MAC PDU. The header of the MAC PDU may be a SL-SCH sub-header as described above with respect to FIGS. 3A and 3B.

For example, a destination field of the header of the MAC PDU may indicate an identity of a relay communication device. The communication device 510A may discard the MAC PDU when the destination field of the header of the MAC PDU does not indicate the identity of the communication device 510A. Otherwise, when the destination field of the header of the MAC PDU indicates the identity of the communication device 510A, the communication device 510A may deliver the MAC SDUs of the MAC PDU to a RLC layer or the transmitting protocol stack of the communication device 510A, depending on the structure of the protocol stacks of communication device 510A.

For example, in some embodiments, referring to FIG. 2A, after receiving data from UE 210B, the UE 210A may decode it into a MAC PDU, and may deliver MAC SDUs to the RLC layer 240A when it is determined that the destination field of the header of the MAC PDU indicates the identity of the UE 210A. The RLC layer 240A may decode RLC PDUs, and may deliver the decoded data from the receiving protocol stack to the transmitting protocol stack of the UE 210A. In some embodiments, referring to FIG. 2B, after receiving data from UE 211B, the UE 211A may decode it into a MAC PDU, and may deliver MAC SDUs from the receiving protocol stack to the transmitting protocol stack of the UE 211A when it is determined that the destination field of the header of the MAC PDU indicates the identity of the UE 211A.

In some embodiments of the present disclosure, the sidelink control information may include at least a part of the identity of a relay communication device, and the destination field of the header of the MAC PDU may include the remaining part of the identity of the relay communication device or all bits of the identity of the relay communication device.

Referring back to FIG. 5A, in some embodiments of the present disclosure, the communication device 510A may determine the destination communication device of the data received from the communication device 510B. As mentioned above, an indication indicating an association between a logical channel and a destination device may be transmitted from the communication device 510B to the communication device 510A during a connection request procedure (e.g., in operation 511). The communication device 510A may determine the destination communication device of the data from the communication device 510B based on the indication.

For example, as mentioned above, the communication device 510A may decode the received data into a MAC PDU. The communication device 510A may further decode a MAC SDU and its corresponding MAC sub-header from the MAC PDU. The MAC sub-header may include a LCID field. The definition of this field is described above with respect to FIG. 3A. The communication device 510A may then identify the logical channel corresponding to the received data based on the LCID field. The communication device 510A may determine that the communication device 510C is the destination communication device of the data based on that the identified logical channel corresponding to the received data is associated with the communication device 510C as indicated by the indication.

In some embodiments of the present disclosure, the communication device 510A may encode the data received from the communication device 510B before transmitting to a destination communication device (e.g., the communication device 510C).

For example, in some embodiments of the present disclosure, the communication device 510A may encode data into a MAC PDU. A header of the MAC PDU may include a source field indicating the identity of a relay communication device (e.g., the communication device 510A) of the data. In some embodiments, the source field may include at least a part of the identity of the relay communication device. The header of the MAC PDU may include a destination field indicating an identity of the destination communication device (e.g., the communication device 510C) of the data. In some embodiments, the destination field may include at least a part of the identity of the destination communication device. The MAC PDU may employ the MAC PDU 300A structure in FIG. 3A or the MAC PDU 300B structure in FIG. 3B.

In some embodiments of the present disclosure, the MAC PDU may include a MAC SDU and a MAC sub-header corresponding to the MAC SDU. The MAC sub-header may include a LCID field. The definition of this field is described above with respect to FIG. 3A. As mentioned above, an indication indicating an association between a logical channel and a source device may be transmitted from the communication device 510A to the communication device 510C during a connection request procedure (e.g., in operation 513). The communication device 510A may determine the value of the LCID field based on the indication. For example, assuming that LCH#C between the communication device 510A and the communication device 510C is associated with the communication device 510B, the communication device 510A may set the LCID field of the MAC sub-header as the LCID of LCH#C.

In some embodiments of the present disclosure, the communication device 510A may deliver the MAC PDU to a PHY layer. The PHY layer may encode TBs corresponding to the MAC PDU for transmitting to the destination communication device (e.g., the communication device 510C).

In some embodiments, sidelink control information may be transmitted with the TBs. For example, the communication device 510A may transmit the sidelink control information before the transmission of the TBs.

In some embodiments, the sidelink control information may indicate an identity of a relay communication device (e.g., the communication device 510A). For example, the sidelink control information may include a source field. The source field of the sidelink control information may include at least a part of the identity of the relay communication device, which can be combined with the source field of the header of the MAC PDU to form the complete identity of the relay communication device. For example, the identity of a relay communication device may be a 24-bit UE ID. The sidelink control information may include 8 bits or all 24 bits of the 24-bit UE ID. The destination field of the header of the MAC PDU may include the remaining 16 bits or all 24 bits of the 24-bit UE ID.

In some embodiments, the sidelink control information may include a destination field indicating an identity of the destination communication device (e.g., the communication device 510C).

In some embodiments of the present disclosure, besides receiving the data on a logical channel between the communication device 510A and the communication device 510B, the communication device 510A may receive another data from the communication device 510B or a communication device (e.g., a communication device 510D, which is not shown in FIG. 5A) different from the communication device 510B on a different logical channel. When the destination communication device of the another data is the same as the destination communication device of the data, the communication device 510A may multiplex the another data and the data for transmitting to the destination communication device. The method for determining the destination communication device of the another data is similar to the one for determining the destination communication device of the data as described above, and thus is omitted herein.

For example, when it is determined that both the another data and the data are destined to the communication device 510C, the communication device 510A may multiplex the another data and the data into the same MAC PDU. A header of the MAC PDU may include a source field indicating the identity of the communication device 510A (i.e., the relay communication device) of the data, and a destination field indicating an identity of the communication device 510C (i.e., the destination communication device). The definition of the header of the MAC PDU is described above, and thus is omitted herein.

In some embodiments of the present disclosure, the communication device 510A may encode the another data and the data into different or the same MAC SDUs of a MAC PDU. As mentioned above, the values of the fields of MAC sub-headers corresponding to the MAC SDUs may be determined based on the association between logical channels and source communication devices. The communication device 510A may encode the another data and the data in a similar manner as described above, and thus is omitted herein.

In some embodiments of the present disclosure, the communication device 510A may deliver the MAC PDU to a PHY layer. At the PHY layer, the communication device 510A may encode TBs corresponding to the MAC PDU in a similar manner as described above, and thus is omitted herein.

In operation 523, the communication device 510A may transmit the encoded data to the destination communication device (e.g., the communication device 510C). In operation 525, the communication device 510C may decode the received data. The decoding process in operation 525 is similar to the decoding process described above with respect to operation 521.

For example, the data from the communication device 510A may include sidelink control information. The communication device 510C may determine discarding the data or delivering the data to an upper layer (e.g., a MAC layer) based on sidelink control information. The definition of the sidelink control information is described above with respect to operation 521. For example, when it is determined that the sidelink control information indicates the identity of the communication device 510C, the communication device 510C may deliver the data to a MAC layer. Otherwise, when it is determined that the sidelink control information does not indicate the identity of the communication device 510C, the communication device 510C may discard the received data.

In some embodiments of the present disclosure, the communication device 510C may decode the received data into a MAC PDU. The communication device 510C may determine discarding the data or delivering the data to an upper layer (e.g., a RLC layer) based on a header of the MAC PDU. For example, the communication device 510C may discard the MAC PDU when the destination field of the header of the MAC PDU does not indicate the identity of the communication device 510C. Otherwise, when the destination field of the header of the MAC PDU indicates the identity of the communication device 510C, the communication device 510C may deliver the MAC SDUs of the MAC PDU to an upper layer (e.g., a RLC layer). The header of the MAC PDU may be a SL-SCH sub-header as described above with respect to FIGS. 3A and 3B.

In some embodiments of the present disclosure, the communication device 510C may determine that the communication device 510C is the destination device of the data. The communication device 510C may determine the source communication device of the data from the communication device 510A. As mentioned above, an indication indicating an association between a logical channel and a source device may be transmitted from the communication device 510A to the communication device 510C during a connection request procedure (e.g., in operation 513). The communication device 510C may determine the source communication device of the data from the communication device 510A based on the indication.

For example, the communication device 510C may decode the received data into a MAC PDU. The communication device 510C may further decode a MAC SDU and its corresponding MAC sub-header from the MAC PDU. The MAC sub-header may include a LCID field. The communication device 510C may then identify the logical channel corresponding to the data based on the LCID field. The communication device 510C may determine that the communication device 510B is the source communication device of the data based on that the identified logical channel corresponding to the data is associated with the communication device 510B as indicated by the indication.

Figure 5B:
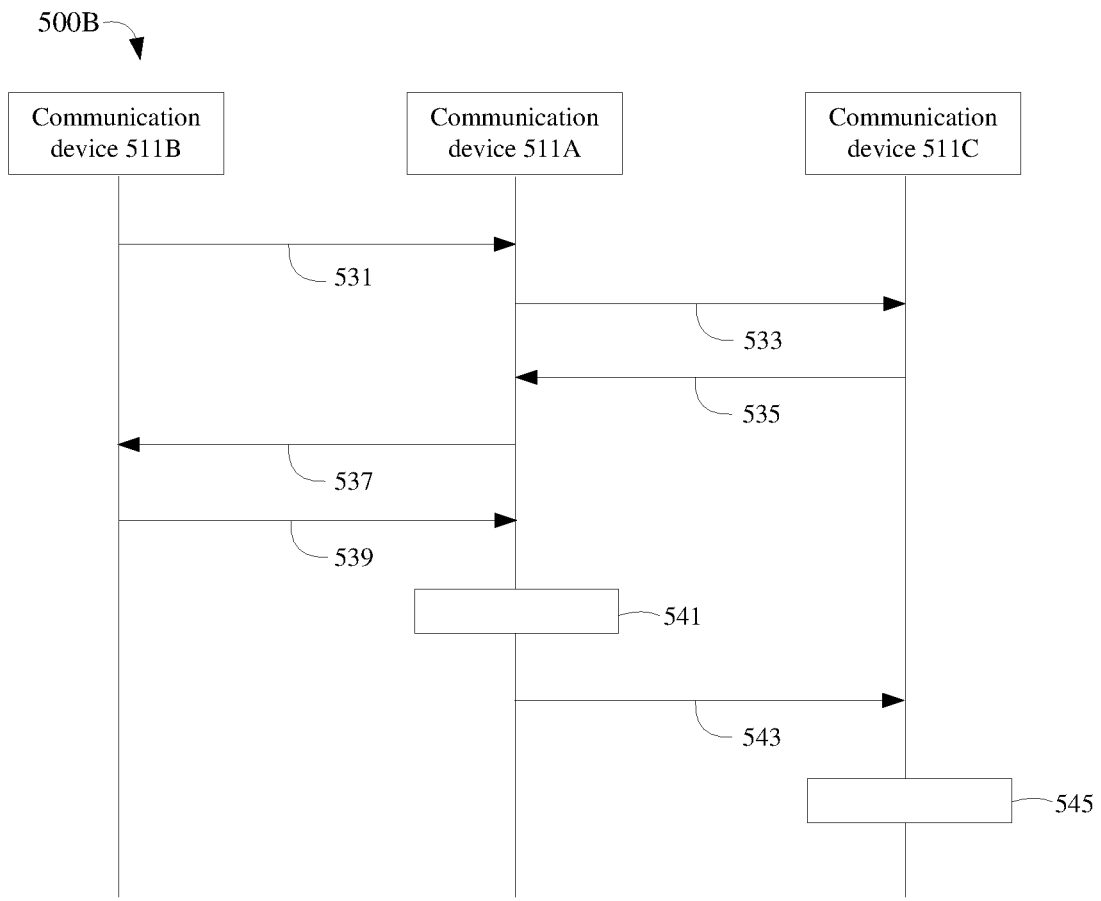
FIG. 5B illustrates a flow chart of an exemplary procedure of performing sidelink communication according to some embodiments of the present disclosure.

FIG. 5B illustrates a flow chart of an exemplary procedure 500B of performing sidelink communication according to some embodiments of the present disclosure.

In some examples, the communication device 511A may function as the communication device 110A in FIG. 1A, the communication device 110A' in FIG. 1B, the UE 210A in FIG. 2A, or the UE 211A in FIG. 2B. The communication device 511B may function as the communication device 110B in FIG. 1A, the communication device 110B' in FIG. 1B, the UE 210B in FIG. 2A, or the UE 211B in FIG. 2B. The communication device 511C may function as the communication device 110C in FIG. 1A, the communication device 110C' in FIG. 1B, the UE 210C in FIG. 2A, or the UE 211C in FIG. 2B.

Similar to FIG. 5A, the exemplary procedure 500B shows a procedure of a source communication device (e.g., the communication device 511B) communicating with a destination communication device (e.g., the communication device 511C) via a relay communication device (e.g., the communication device 511A).

Referring to FIG. 5B, in operation 531, a source communication device (e.g., the communication device 511B) may transmit a connection request to a relay communication device (e.g., the communication device 511A). In some embodiments of the present disclosure, the connection request to the communication device 511A may be transmitted via an AS layer message.

In some embodiments of the present disclosure, the connection request to the relay communication device (e.g., the communication device 511A) may include an indication of at least one destination communication device (e.g., the communication device 510C). With such indication, a relay communication device may know whether data to be transmitted to the relay communication device should be forwarded or relayed to a destination device.

In operation 533, the communication device 511A may transmit a connection request to the communication device 511C. In some embodiments of the present disclosure, the connection request to the communication device 511C may be transmitted via an Access Stratum (AS) layer message.

In operation 535, the communication device 511C may transmit an acknowledgement to the communication device 511A in response to receiving the connection request from the communication device 511A. In operation 537, the communication device 511A may transmit an acknowledgement to the communication device 511B in response to receiving the acknowledgement from the communication device 511C.

After the above procedure, the communication device 511B and the communication device 511C may communicate with each other via the communication device 511A. In some embodiments of the present disclosure, a communication device 511D (not shown in FIG. 5B) may establish a sidelink communicate with the communication device 511C or a different communication device (e.g., a communication device 511E, which is not shown in FIG. 5B) via the communication device 511A by performing operations similar to operations 531-537.

After establishing a communication with the communication device 511C via the communication device 511A, the communication device 511B may transmit data to the communication device 511C via the communication device 511A.

In some embodiments of the present disclosure, at the MAC layer, the communication device 511B may encode SDUs from an upper layer (e.g., RLC layer) into a MAC PDU. A header of the MAC PDU may include a destination field indicating the identity of a destination communication device (e.g., the communication device 511C) of the data. In some embodiments, the destination field may include at least a part of the identity of the destination communication device. The header of the MAC PDU may include a source field indicating the identity of a source communication device (e.g., the communication device 511B) of the data. In some embodiments, the source field may include at least a part of the identity of the source communication device. The header of the MAC PDU may be a SL-SCH sub-header as described above with respect to FIGS. 3A and 3B.

The communication device 511B may deliver the MAC PDU to a PHY layer. The PHY layer may receive TBs corresponding to the MAC PDU for transmission. In some embodiments, sidelink control information may be transmitted with the TBs. For example, the communication device 511B may transmit the sidelink control information before the transmission of the TBs. The sidelink control information may indicate the time-frequency location of a corresponding sidelink data transmission (e.g., the transmission of the TBs). In some embodiments, the sidelink control information may indicate an identity of a relay communication device (e.g., the communication device 511A). For example, the sidelink control information may include a destination field. The destination field of the sidelink control information may include at least a part of the identity of the relay communication device. For example, the identity of a relay communication device may be a 24-bit UE ID. The sidelink control information may include 8 bits or all 24 bits of the 24-bit UE ID. In some embodiments, the sidelink control information may include a source field indicating an identity of the source communication device (e.g., the communication device 511B).

After the above encoding processes, the communication device 511B may transmit, in operation 539, data to the communication device 511A. In operation 541, the communication device 511A may decode the received data. For example, the communication device 511A may determine discarding, relaying, or accepting the data.

In some embodiments of the present disclosure, the data may include sidelink control information. The communication device 511A may determine discarding the data or delivering the data to an upper layer (e.g., a MAC layer) based on the sidelink control information. For example, the communication device 511A may determine whether the sidelink control information indicates the identity of the communication device 511A. When it is determined that the sidelink control information indicates the identity of the communication device 511A, the communication device 511A may deliver the data to the MAC layer. Otherwise, when it is determined that the sidelink control information does not indicate the identity of the communication device 511A, the communication device 511A may discard the received data.

In some embodiments of the present disclosure, when it is determined that the sidelink control information indicates the identity of the communication device 511A, the communication device 511A may decode the received data into a MAC PDU, and may deliver the same to a MAC layer. The MAC PDU may employ the MAC PDU 300A structure in FIG. 3A or the MAC PDU 300B structure in FIG. 3B. The communication device 511A may determine relaying or accepting the data based on a header of the MAC PDU. The header of the MAC PDU may be a SL-SCH sub-header as described above with respect to FIGS. 3A and 3B.

As mentioned above, an indication of at least one destination communication device may be transmitted from the communication device 511B to the communication device 511A during a connection request procedure (e.g., in operation 531). The communication device 511A may determine the destination communication device of the data from the communication device 511B based on the indication.

For example, a destination field of the header of the MAC PDU decoded from the data received from communication device 511B may indicate an identity of a destination communication device. When the destination field of the header of the MAC PDU indicates the identity of the communication device 511A, which means that the communication device 511A is the destination communication device of the data, the communication device 511A may accept the MAC PDU. When the destination field of the header of the MAC PDU indicates one of the at least one destination communication device indicated by the above-mentioned indication, the communication device 511A may relay the data to the communication device indicated in the destination field of the header of the MAC PDU. For example, the communication device 511A may deliver the MAC SDUs of the MAC PDU to an upper layer (e.g., a RLC layer) or the transmitting protocol stack of the communication device 511A.

For example, in some embodiments, referring to FIG. 2A, after receiving data from UE 210B, the UE 210A may decode it into MAC PDUs, and may deliver MAC SDUs to the RLC layer 240A when it is determined that the UE 210C is indicated in the above-mentioned indication. The RLC layer 240A may decode the SDUs, and may deliver the decoded data from the receiving protocol stack to the transmitting protocol stack of the UE 210A. In some embodiments, referring to FIG. 2B, after receiving data from UE 211B, the UE 211A may decode it into MAC PDUs, may deliver MAC SDUs from the receiving protocol stack to the transmitting protocol stack of the UE 211A when it is determined that the UE 210C is indicated in the above-mentioned indication.

In some embodiments of the present disclosure, the communication device 511A may encode the data from the communication device 511B before transmitting to the destination communication device (e.g., the communication device 511C) of the data.

For example, the communication device 511A may encode the data into a MAC PDU. The MAC PDU may employ the MAC PDU 300A structure in FIG. 3A or the MAC PDU 300B structure in FIG. 3B. A header of the MAC PDU may include a source field indicating the identity of a source communication device (e.g., the communication device 511B) of the data. In some embodiments, the source field may include at least a part of the identity of the source communication device. The header of the MAC PDU may include a destination field indicating an identity of the destination communication device (e.g., the communication device 511C) of the data. In some embodiments, the destination field may include at least a part of the identity of the destination communication device. The header of the MAC PDU may be a SL-SCH sub-header as described above with respect to FIGS. 3A and 3B.

In some embodiments of the present disclosure, the communication device 511A may deliver the MAC PDU to a PHY layer. The PHY layer may encode TBs corresponding to the MAC PDU for transmitting to the destination communication device (e.g., the communication device 511C). In some embodiments, sidelink control information may be transmitted with the TBs. For example, the communication device 511A may transmit the sidelink control information before the transmission of the TBs. In some embodiments, the sidelink control information may indicate an identity of a relay communication device (e.g., the communication device 511A). For example, the sidelink control information may include a source field. The source field of the sidelink control information may include at least a part of the identity of the relay communication device. For example, the identity of a relay communication device may be a 24-bit UE ID. The sidelink control information may include 8 bits or all 24 bits of the 24-bit UE ID. In some embodiments, the sidelink control information may include a destination field indicating an identity of the destination communication device (e.g., the communication device 511C).

In operation 543, the communication device 511A may transmit the encoded data to the destination communication device (e.g., the communication device 511C). In operation 545, the communication device 511C may decode the received data. The decoding process in operation 525 is similar to the decoding process described above with respect to operation 541.

For example, the communication device 511C may determine discarding or accepting the data from the communication device 511A. In some embodiments of the present disclosure, at the PHY layer, the communication device 511C may determine discarding the data or delivering the data to an upper layer (e.g., the MAC layer) based on sidelink control information. The definition of the sidelink control information is described above with respect to operation 541, and thus is omitted herein. For example, when it is determined that the sidelink control information indicates the identity of the communication device 511C, the communication device 511C may deliver the data to the MAC layer. Otherwise, when it is determined that the sidelink control information does not indicate the identity of the communication device 511C, the communication device 511C may discard the received data.

In some embodiments of the present disclosure, at the MAC layer, the communication device 511C may determine the destination and source communication devices of the data based on the header of the MAC PDU decoded from the received data. The definition of the header of the MAC PDU is described above with respect to operation 521, and thus is omitted herein. The header of the MAC PDU may be a SL-SCH sub-header as described above with respect to FIGS. 3A and 3B. For example, the communication device 511B may be determined as the source communication device of the data based on the source field of the header of the MAC PDU indicating the identity of the communication device 511B. The communication device 511C may be determined as the destination communication device of the data based on the destination field of the header of the MAC PDU indicating the identity of the communication device 511C. The communication device 511C may then accept the data, and may deliver the MAC PDU to an upper layer (e.g., RLC layer) for further decoding.

Figure 5C:
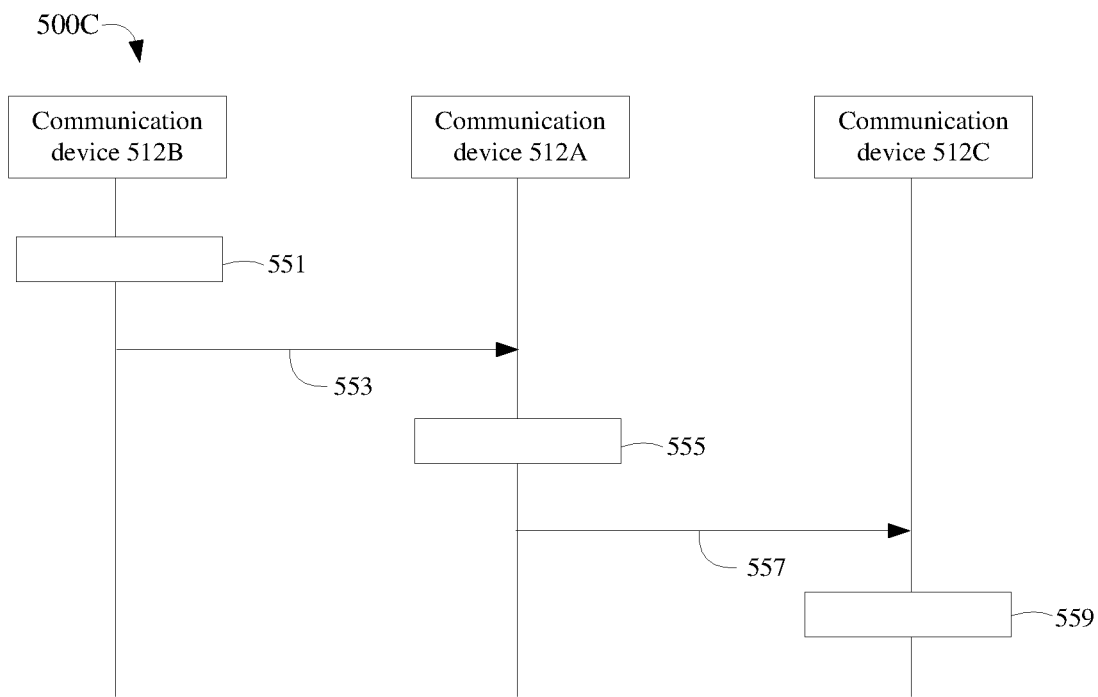
FIG. 5C illustrates a flow chart of an exemplary procedure of performing sidelink communication according to some embodiments of the present disclosure.

FIG. 5C illustrates a flow chart of an exemplary procedure 500C of performing sidelink communication according to some embodiments of the present disclosure.

In some examples, the communication device 512A may function as the communication device 110A in FIG. 1A, the communication device 110A' in FIG. 1B, the UE 210A in FIG. 2A, or the UE 211A in FIG. 2B. The communication device 512B may function as the communication device 110B in FIG. 1A, the communication device 110B' in FIG. 1B, the UE 210B in FIG. 2A, or the UE 211B in FIG. 2B. The communication device 512C may function as the communication device 110C in FIG. 1A, the communication device 110C' in FIG. 1B, the UE 210C in FIG. 2A, or the UE 211C in FIG. 2B.

Similar to FIGS. 5A and 5B, the exemplary procedure 500C shows a procedure of a source communication device (e.g., the communication device 512B) communicating with a destination communication device (e.g., the communication device 512C) via a relay communication device (e.g., the communication device 512A).

In operation 551, the communication device 512B (i.e., the source communication device) may encode data to be transmitted to the communication device 512C via the communication device 512A.

For example, in some embodiments of the present disclosure, at the MAC layer, the communication device 512B may encode SDUs from an upper layer (e.g., RLC layer) into a MAC PDU. The MAC PDU may have an interleave format as described above with respect to FIG. 3B. That is, the MAC PDU may include at least one MAC sub-header and at least one MAC SDU, and each MAC sub-header of the at least one MAC sub-header corresponds to a respective one of the at least one MAC SDU.

In some embodiments of the present disclosure, each of the at least one MAC sub-header may include a source field and a destination field. The destination field may include at least a part of the identity of the destination communication device. The source field may include at least a part of the identity of the source communication device. For example, the identity of a communication device may be a 24-bit UE ID. The destination field and the source field of the MAC sub-header may include 16 bits or all 24 bits of the 24-bit UE ID of the corresponding communication device.

For example, the MAC PDU may include two MAC SDUs (SDU#1 and SDU#2) and two corresponding MAC sub-headers (sub-header#1 and sub-header#2). The MAC PDU may start with sub-header#1, followed by SDU#1, sub-header#2, and SDU#2. Sub-header#1 may include a source field indicating the source communication device of SDU#1, and a destination field indicating the destination communication device of SDU#1. Sub-header#2 may include a source field indicating the source communication device of SDU#2, and a destination field indicating the destination communication device of SDU#2. A destination field of sub-header#1 may be the same or different from that of sub-header#2. In other words, data to different destination devices can be multiplexed in the same MAC PDU. In some examples, the MAC PDU may include fewer or more MAC SDUs and corresponding MAC sub-headers.

In some embodiments of the present disclosure, the MAC sub-header 400 structure as described above with respect to FIG. 4 may be applied to each of the at least one MAC sub-header of the MAC PDU.

In some embodiments of the present disclosure, the communication device 512B may deliver the MAC PDU to a PHY layer. The PHY layer may receive TBs corresponding to the MAC PDU for transmission. In some embodiments, sidelink control information may be transmitted with the TBs. For example, the communication device 512B may transmit the sidelink control information before the transmission of the TBs. In some embodiments, the sidelink control information may indicate an identity of a relay communication device (e.g., the communication device 512A). For example, the sidelink control information may include a destination field. The destination field of the sidelink control information may include at least a part of the identity of the relay communication device. For example, the identity of a relay communication device may be a 24-bit UE ID. The sidelink control information may include 8 bits or all 24 bits of the 24-bit UE ID.

In operation 553, the communication device 512B may transmit the data to the communication device 512A. In operation 555, the communication device 512A may decode the received data.

In some embodiments of the present disclosure, the data may include sidelink control information. The communication device 512A may determine discarding the data or delivering the data to an upper layer (e.g., a MAC layer) based on the sidelink control information. For example, the communication device 512A may determine whether the sidelink control information indicates the identity of the communication device 512A. When it is determined that the sidelink control information indicates the identity of the communication device 512A, the communication device 512A may deliver the data to the MAC layer. Otherwise, when it is determined that the sidelink control information does not indicate the identity of the communication device 512A, the communication device 512A may discard the received data.

In some embodiments of the present disclosure, the communication device 512A may decode the received data into a MAC PDU. For example, when it is determined that the sidelink control information indicates the identity of the communication device 512A, the communication device 512A may decode the received data into a MAC PDU. As mentioned above, the MAC PDU may have an interleave format as described above with respect to FIG. 3B. The communication device 512A may decode or de-multiplex the MAC PDU into at least one MAC SDU and at least one MAC sub-header corresponding to the at least one MAC SDU. The MAC sub-header may have a MAC sub-header 400 structure as shown in FIG. 4. Therefore, the communication device 512A may determine respective source communication devices and respective destination communication devices of the at least one MAC SDU. The communication device 512A may encode or multiplex two or more MAC SDUs having the same destination communication device into the same MAC PDU. The two or more MAC SDUs may be received on the same or different logical channels. For example, the LCID fields of the MAC sub-headers corresponding to the two or more MAC SDUs may be different.

In some embodiments of the present disclosure, a communication device 512D (not shown in FIG. 5C) may also establish a sidelink communicate with the communication device 512C via the communication device 512A. Besides receiving the data from the communication device 512B, the communication device 512A may receive another data from the communication device 512D for relaying to the communication device 512C. Similarly to decoding the data from the communication device 512B, the communication device 512A may decode the another data from the communication device 512D. In some embodiments, the communication device 512A may determine that the destination communication devices of a MAC SDU of the data and another MAC SDU of the another data are the same. The communication device 512A may encode or multiplex the MAC SDU and the another MAC SDU, which are received on different logical channels, into the same MAC PDU.

In some embodiments of the present disclosure, the communication device 512A may encode the MAC PDU according to an interleave format as described above with respect to FIG. 3B. The MAC sub-header of the MAC PDU may have a MAC sub-header 400 structure as shown in FIG. 4. For example, the communication device 512A may encode the MAC PDU in a similar manner as described above with respect to operation 551.

In some embodiments of the present disclosure, the communication device 512A may deliver the MAC PDU to a PHY layer. The PHY layer may receive TBs corresponding to the MAC PDU for transmission. In some embodiments, sidelink control information may be transmitted with the TBs. For example, the communication device 512A may transmit the sidelink control information before the transmission of the TBs. In some embodiments, the sidelink control information may indicate an identity of a relay communication device (e.g., the communication device 512A).

Such indication in the sidelink control information may be used for retransmission combination. For example, the communication device 512A may retransmit data to the communication device 512C if the communication device 512C fails to decode previous data. With the indication in the sidelink control information, the communication device 512C can identify that the retransmitted data and the previous data are from the same communication device (e.g., the communication device 512A). The communication device 512C may combine the retransmitted data and the previous data to decode the data. Retransmission combination may advantageously improve the decoding success rate.

In some embodiments, the sidelink control information may include a source field. The source field of the sidelink control information may include at least a part of the identity of the relay communication device. For example, the identity of a relay communication device may be a 24-bit UE ID. The sidelink control information may include 8 bits or all 24 bits of the 24-bit UE ID. In some embodiments, the sidelink control information may include a destination field indicating an identity of the destination communication device (e.g., the communication device 512C).

In operation 557, the communication device 512A may transmit the encoded data to the destination communication device (e.g., the communication device 512C).

In operation 559, the communication device 512C may decode the received data. The decoding process in operation 559 is similar to the decoding process described above with respect to operation 555. For example, the communication device 512C may determine respective source communication devices and respective destination communication devices of the MAC SDUs in a MAC PDU based on the destination fields and the source fields in the corresponding MAC sub-headers.

Figure 5D:
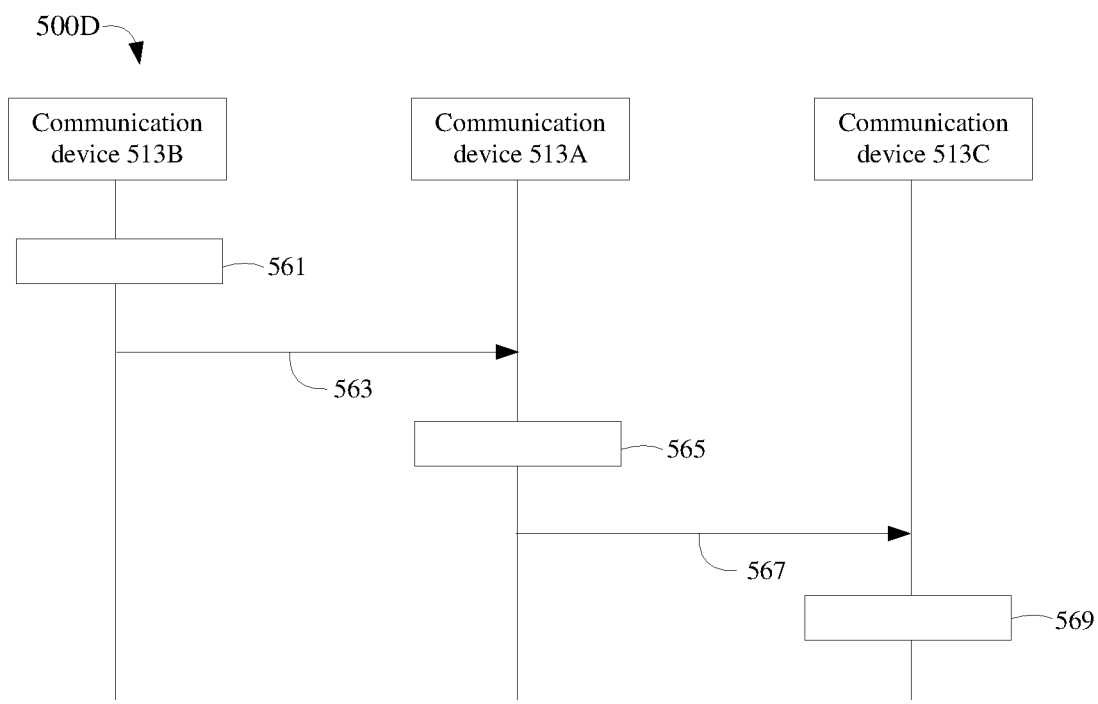
FIG. 5D illustrates a flow chart of an exemplary procedure of performing sidelink communication according to some embodiments of the present disclosure.
Figure 5E:
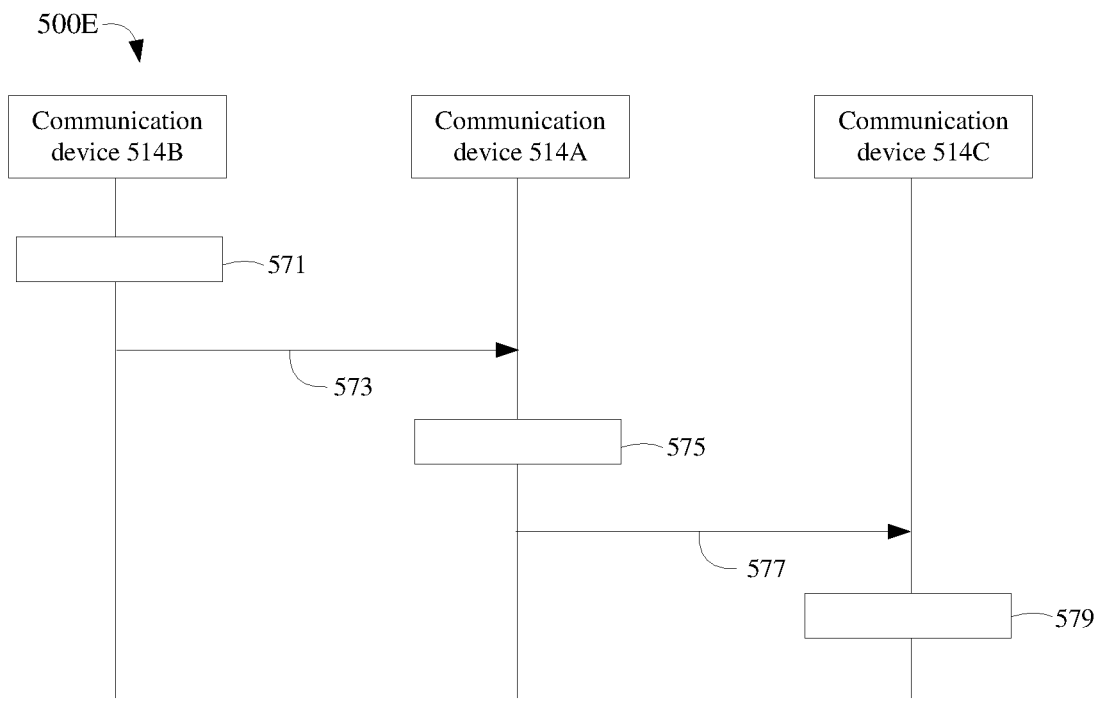
FIG. 5E illustrates a flow chart of an exemplary procedure of performing sidelink communication according to some embodiments of the present disclosure.

FIGS. 5D and 5E illustrates exemplary procedures of performing sidelink communication according to embodiments of the present disclosure. The protocol stacks of the communication devices in FIGS. 5D and 5E may include ADAP layers above the RLC layers (as shown in FIG. 2C) or between the MAC layers and the RLC layers (as shown in FIG. 2D). The exemplary procedures in FIGS. 5D and 5E are based on the assumption that the ADAP layers are located above the RLC layers. However, corresponding modifications to the exemplary procedures in FIGS. 5D and 5E may be apparent to persons skilled in the art to serve the condition where the ADAP layers are located between the MAC layers and the RLC layers.

FIG. 5D illustrates a flow chart of an exemplary procedure 500D of performing sidelink communication according to some embodiments of the present disclosure.

In some examples, the communication device 513A may function as the communication device 110A in FIG. 1A, the communication device 110A' in FIG. 1B, the UE 212A in FIG. 2C, or the UE 213A in FIG. 2D. The communication device 513B may function as the communication device 110B in FIG. 1A, the communication device 110B' in FIG. 1B, the UE 212B in FIG. 2C, or the UE 213B in FIG. 2D. The communication device 513C may function as the communication device 110C in FIG. 1A, the communication device 110C' in FIG. 1B, the UE 212C in FIG. 2C, or the UE 213C in FIG. 2D.

Similar to FIGS. 5A-5C, the exemplary procedure 500D shows a procedure of a source communication device (e.g., the communication device 513B) communicating with a destination communication device (e.g., the communication device 513C) via a relay communication device (e.g., the communication device 513A).

In operation 561, the communication device 513B (i.e., the source communication device) may encode data to be transmitted to the communication device 513C via the communication device 513A.

For example, in some embodiments of the present disclosure, at an ADAP layer, the communication device 513B may encode SDUs from an upper layer (e.g., PDCP layer) into an ADAP PDU. A header of an ADAP PDU may include a source field indicating an identity of a source communication device (e.g., the communication device 513B) and a destination field indicating an identity of a destination communication device (e.g., the communication device 513C). The ADAP SDUs of an ADAP PDU may include data to be transmitted from the source communication device to the destination communication device. The communication device 513B may deliver at least one ADAP PDU to a lower layer (e.g., RLC layer).

In some embodiments of the present disclosure, at a RLC layer, the communication device 513B may encode SDUs from an upper layer (e.g., an ADAP layer) into a RLC PDU, and may deliver at least one RLC PDU to a lower layer (e.g., MAC layer).

In some embodiments of the present disclosure, at a MAC layer, the communication device 513B may encode SDUs from an upper layer (e.g., RLC layer) into a MAC PDU. A header of the MAC PDU may include a destination field indicating the identity of a relay communication device (e.g., the communication device 513A). In some embodiments, the destination field may include at least a part of the identity of the relay communication device. The header of the MAC PDU may include a source field indicating the identity of a source communication device (e.g., the communication device 513B). In some embodiments, the source field may include at least a part of the identity of the source communication device. The header of the MAC PDU may be a SL-SCH sub-header as described above with respect to FIGS. 3A and 3B. The communication device 513B may deliver the MAC PDU to a lower layer (e.g., a PHY layer).

In some embodiments of the present disclosure, at a PHY layer, the communication device 513B may encode TBs corresponding to the MAC PDU for transmission. In some embodiments, sidelink control information may be transmitted with the TBs. For example, the communication device 513B may transmit the sidelink control information before the transmission of the TBs. In some embodiments, the sidelink control information may indicate an identity of a relay communication device (e.g., the communication device 513A). For example, the sidelink control information may include a destination field. The destination field of the sidelink control information may include at least a part of the identity of the relay communication device, which can be combined with the destination field of the header of the MAC PDU to form the complete identity of the relay communication device.

For example, the identity of a relay communication device may be a 24-bit UE ID. The sidelink control information may include 8 bits or all 24 bits of the 24-bit UE ID.

The destination field of the header of the MAC PDU may include the remaining 16 bits or all 24 bits of the 24-bit UE ID.

In some embodiments, the sidelink control information may include a source field indicating an identity of the source communication device (e.g., the communication device 513B).

After the above encoding processes, the communication device 513B may transmit, in operation 563, the encoded data to the communication device 513A. In operation 565, the communication device 513A may decode the received data.

In some embodiments of the present disclosure, the data may include sidelink control information. The communication device 513A may determine discarding the data or delivering the data to an upper layer (e.g., a MAC layer) based on the sidelink control information. For example, the communication device 513A may determine whether the sidelink control information indicates the identity of the communication device 513A. When it is determined that the sidelink control information indicates the identity of the communication device 513A, the communication device 513A may deliver the data to the MAC layer. Otherwise, when it is determined that the sidelink control information does not indicate the identity of the communication device 513A, the communication device 513A may discard the received data.

In some embodiments of the present disclosure, the communication device 513A may decode the received data into a MAC PDU. For example, when it is determined that the sidelink control information indicates the identity of the communication device 513A, the communication device 513A may decode the received data into a MAC PDU. The MAC PDU may employ the MAC PDU 300A structure in FIG. 3A or the MAC PDU 300B structure in FIG. 3B. The communication device 513A may determine discarding the MAC PDU or delivering the MAC PDU to an upper layer (e.g., a RLC layer) based on a header of the MAC PDU. The header of the MAC PDU may be a SL-SCH sub-header as described above with respect to FIGS. 3A and 3B.

For example, the communication device 513A may determine whether a destination field of the header of the MAC PDU indicates the identity of the communication device 513A. When it is determined that the destination field indicates the identity of the communication device 513A, the communication device 513A may deliver the data to the RLC layer. Otherwise, when it is determined that the destination field does not indicate the identity of the communication device 513A, the communication device 513A may discard the received data.

In some embodiments of the present disclosure, the communication device 513A may decode the received data into an ADAP PDU. For example, the communication device 513A may decode the MAC PDU into a RLC PDU, and may decode the RLC PDU into an ADAP PDU. As mentioned above with respect to operation 561, a header of the ADAP PDU may include a source field indicating an identity of a source communication device (e.g., the communication device 513B) and a destination field indicating an identity of a destination communication device (e.g., the communication device 513C). Therefore, the communication device 513A may determine the destination communication device of the ADAP SDUs in the ADAP PDU based on the destination field in the header of the ADAP PDU, and may relay the received data to the destination communication device.

For example, the communication device 513A may determine that the destination of the data received from the communication device 513B is the communication device 513C based on a header of an ADAP PDU, and may relay the received data to the communication device 513C.

In some embodiments of the present disclosure, the communication device 513A may encode the data from the communication device 513B before transmitting to the destination communication device (e.g., the communication device 513C). The communication device 513A may encode the data in a similar manner as described above with respect to operation 561 with at least one of the following exceptions:

- A header of a MAC PDU may include a source field indicating the identity of a relay communication device (e.g., the communication device 513A). In some embodiments, the source field may include at least a part of the identity of the relay communication device.
- A header of a MAC PDU may include a destination field indicating the identity of a destination communication device (e.g., the communication device 513C). In some embodiments, the destination field may include at least a part of the identity of the relay communication device.
- The sidelink control information may indicate an identity of a relay communication device (e.g., the communication device 513A), which may be used for retransmission combination. For example, the sidelink control information may include a source field. The source field of the sidelink control information may include at least a part of the identity of the relay communication device.
- The sidelink control information may indicate an identity of a destination communication device (e.g., the communication device 513C). For example, the sidelink control information may include a destination field. The destination field of the sidelink control information may include at least a part of the identity of the destination communication device (e.g., the communication device 513C).

In some embodiments of the present disclosure, a communication device 513D (not shown in FIG. 5D) may also establish a sidelink communicate with the communication device 513C via the communication device 513A. Besides receiving data from the communication device 513B, the communication device 513A may receive another data from the communication device 513D for relaying to the communication device 513C. Similarly to decoding the data from the communication device 513B, the communication device 513A may decode the another data from the communication device 513D. In some embodiments, the communication device 513A may determine that the destination communication devices of an ADAP SDU of the data and another ADAP SDU of the another data are the same. The communication device 513A may encode or multiplex the ADAP SDU and the another ADAP SDU into different ADAP PDUs, which may be encoded into the same MAC PDU.

For example, in some embodiments of the present disclosure, the ADAP SDU may be encoded into ADAP PDU#1. A header of ADAP PDU#1 may include a source field indicating an identity of the communication device 513B and a destination field indicating an identity of the communication device 513C. The another ADAP SDU may be encoded into ADAP PDU#2. A header of ADAP PDU#2 may include a source field indicating an identity of the communication device 513D and a destination field indicating an identity of the communication device 513C. ADAP PDU#1 and ADAP PDU#2 may be encoded into the same MAC PDU. A header of the MAC PDU may include a source field indicating the identity of a relay communication device (e.g., the communication device 513A), and may include a destination field indicating the identity of a destination communication device (e.g., the communication device 513C).

In operation 567, the communication device 513A may transmit the encoded data to the destination communication device (e.g., the communication device 513C).

In operation 569, the communication device 513C may decode the received data. The decoding process in operation 569 is similar to the decoding process described above with respect to operation 565. The communication device 513C may determine source communication device(s) and destination communication device(s) of the data at an ADAP layer. For example, the communication device 513C may determine the respective source communication devices and respective destination communication devices of ADAP SDUs in ADAP PDUs based on the destination fields and the source fields in the headers of the ADAP PDUs.

FIG. 5E illustrates a flow chart of an exemplary procedure 500E of performing sidelink communication according to some embodiments of the present disclosure.

In some examples, the communication device 514A may function as the communication device 110A in FIG. 1A, the communication device 110A' in FIG. 1B, the UE 212A in FIG. 2C, or the UE 213A in FIG. 2D. The communication device 514B may function as the communication device 110B in FIG. 1A, the communication device 110B' in FIG. 1B, the UE 212B in FIG. 2C, or the UE 213B in FIG. 2D. The communication device 514C may function as the communication device 110C in FIG. 1A, the communication device 110C' in FIG. 1B, the UE 212C in FIG. 2C, or the UE 213C in FIG. 2D.

Similar to FIGS. 5A-5D, the exemplary procedure 500E shows a procedure of a source communication device (e.g., the communication device 514B) communicating with a destination communication device (e.g., the communication device 514C) via a relay communication device (e.g., the communication device 514A).

In operation 571, the communication device 514B (i.e., the source communication device) may encode data to be transmitted to the communication device 514C via the communication device 514A.

For example, in some embodiments of the present disclosure, at an ADAP layer, the communication device 514B may encode SDUs from an upper layer (e.g., PDCP layer) into an ADAP PDU. A header of the ADAP PDU may include a field indicating an identity of a relay communication device (e.g., the communication device 514A). The field may include at least a part of the identity of the relay communication device. The communication device 514B may deliver at least one ADAP PDU to a lower layer (e.g., RLC layer).

In some embodiments of the present disclosure, at a RLC layer, the communication device 514B may encode SDUs from an upper layer (e.g., an ADAP layer) into a RLC PDU, and may deliver at least one RLC PDU to a lower layer (e.g., MAC layer).

In some embodiments of the present disclosure, at a MAC layer, the communication device 514B may encode SDUs from an upper layer (e.g., RLC layer) into a MAC PDU. A header of the MAC PDU may include a destination field indicating an identity of a destination communication device (e.g., the communication device 514C). In some embodiments, the destination field may include at least a part of the identity of the destination communication device. The header of the MAC PDU may include a source field indicating an identity of a source communication device (e.g., the communication device 514B). In some embodiments, the source field may include at least a part of the identity of the source communication device. The header of the MAC PDU may be a SL-SCH sub-header as described above with respect to FIGS. 3A and 3B. The communication device 514B may deliver the MAC PDU to a lower layer (e.g., a PHY layer).

In some embodiments of the present disclosure, at a PHY layer, the communication device 514B may encode TBs corresponding to the MAC PDU for transmission. In some embodiments, sidelink control information may be transmitted with the TBs. For example, the communication device 514B may transmit the sidelink control information before the transmission of the TBs. In some embodiments, the sidelink control information may indicate an identity of a relay communication device (e.g., the communication device 514A). For example, the sidelink control information may include a destination field. The destination field of the sidelink control information may include at least a part of the identity of the relay communication device.

After the above encoding processes, the communication device 514B may transmit, in operation 573, the encoded data to the communication device 514A. In operation 575, the communication device 514A may decode the received data.

In some embodiments of the present disclosure, the data may include sidelink control information. The communication device 514A may determine discarding the data or delivering the data to an upper layer (e.g., a MAC layer) based on the sidelink control information.

In some embodiments of the present disclosure, the communication device 514A may decode the received data into a MAC PDU. As mentioned above with respect to operation 571, a header of the MAC PDU may include a destination field indicating an identity of a destination communication device (e.g., the communication device 514C), and may include a source field indicating an identity of a source communication device (e.g., the communication device 514B).

In some embodiments of the present disclosure, the communication device 514A may decode the received data into an ADAP PDU. As mentioned above with respect to operation 571, a header of the ADAP PDU may include a field indicating an identity of a relay communication device (e.g., the communication device 514A). The communication device 514A may determine discarding the data or relaying the data based on the field in the header of the ADAP PDU. For example, the communication device 514A may determine whether the above field indicates the identity of the communication device 514A. When it is determined that the above field indicates the identity of the communication device 514A, the communication device 514A may deliver the data to an upper layer (e.g., MAC layer). Otherwise, when it is determined that the above field does not indicate the identity of the communication device 514A, the communication device 514A may discard the received data.

In some embodiments of the present disclosure, the communication device 514A may encode the data from the communication device 514B before transmitting to the destination communication device (e.g., the communication device 514C). The communication device 514A may encode the data in a similar manner as described above with respect to operation 571 with at least one of the following exceptions:

The sidelink control information may indicate an identity of a relay communication device (e.g., the communication device 514A), which may be used for retransmission combination. For example, the sidelink control information may include a source field. The source field of the sidelink control information may include at least a part of the identity of the relay communication device.

The sidelink control information may indicate an identity of a destination communication device (e.g., the communication device 514C). For example, the sidelink control information may include a destination field. The destination field of the sidelink control information may include at least a part of the identity of the destination communication device (e.g., the communication device 514C).

ADAP layer configuration described above with respect to operation 571 may not be applied.

In operation 577, the communication device 514A may transmit the encoded data to the destination communication device (e.g., the communication device 514C).

In operation 579, the communication device 514C may decode the received data. The decoding process in operation 579 is similar to the decoding process described above with respect to operation 575. The communication device 514C may determine source communication device(s) and destination communication device(s) of the data at a MAC layer. For example, the communication device 514C may determine a source communication device and a destination communication device of MAC SDUs in a MAC PDU based on the destination fields and the source fields in the header of the MAC PDU.

It should be appreciated by persons skilled in the art that some of the operations in exemplary procedures 500A-500E may be eliminated, without departing from the spirit and scope of the disclosure.

Figure 6:
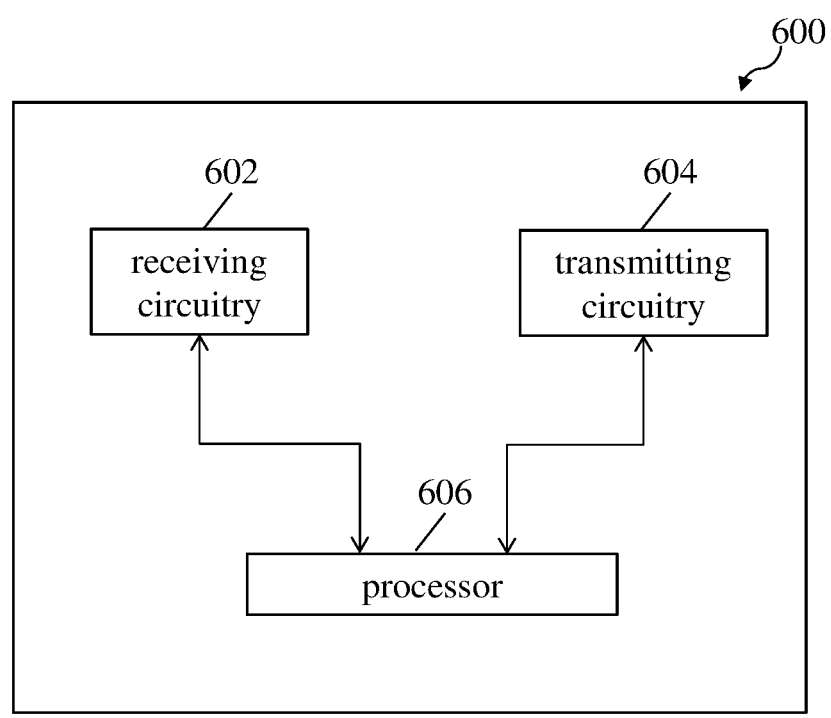
FIG. 6 illustrates an example block diagram of an apparatus according to some embodiments of the present disclosure.

FIG. 6 illustrates an example block diagram of an apparatus 600 according to some embodiments of the present disclosure.

As shown in FIG. 6, the apparatus 600 may include at least one non-transitory computer-readable medium (not illustrated in FIG. 6), a receiving circuitry 602, a transmitting circuitry 604, and a processor 606 coupled to the non-transitory computer-readable medium (not illustrated in FIG. 6), the receiving circuitry 602 and the transmitting circuitry 604. The apparatus 600 may be a communication device (e.g., a UE).

Although in this figure, elements such as processor 606, transmitting circuitry 604, and receiving circuitry 602 are described in the singular, the plural is contemplated unless a limitation to the singular is explicitly stated. In some embodiments of the present disclosure, the receiving circuitry 602 and the transmitting circuitry 604 are combined into a single device, such as a transceiver. In certain embodiments of the present disclosure, the apparatus 600 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 606 interacting with receiving circuitry 602 and transmitting circuitry 604, so as to perform the steps with respect to the communication devices or UEs depicted in FIGS. 1A-1B, 2A-2D, and 5A-5E.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, a register, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The following is what is claimed:

1. A method performed by a user equipment (UE), the method comprising:
receiving a first data from a second UE, wherein the first data comprises first sidelink control information, and the first sidelink control information comprises a destination field indicating an identity of the first UE; and
decoding the first data into a first medium access control (MAC) protocol data unit (PDU),
wherein:
the first MAC PDU comprises a destination field indicating the identity of the first UE;
the destination field of the first sidelink control information comprises a part of the identity of the first UE; and
the destination field of the first MAC PDU comprises the remaining part of the identity of the first UE.

2. The method of claim 1,
wherein:
the first MAC PDU comprises at least one MAC sub-header and at least one MAC service data unit (SDU), each MAC sub-header of the at least one MAC sub-header corresponds to a respective one of the at least one MAC SDU, and each MAC sub-header comprises a source field and a destination field; and the source field indicates an identity of a source communication device of a corresponding MAC SDU, and the destination field indicates an identity of a destination communication device of the corresponding MAC SDU.

3. The method of claim 2, wherein:

the source field comprises at least a part of the identity of the source communication device, and wherein the destination field comprises at least a part of the identity of the destination communication device;

the first MAC PDU comprises a first MAC SDU and a second MAC SDU, and the destination communication device of the first MAC SDU is different from the destination communication device of the second MAC SDU;

or a combination thereof.

4. The method of claim 2, wherein the first MAC PDU comprises a first MAC SDU, and the method further comprises:

transmitting a second data associated with the first data to the destination communication device of the first MAC SDU when the destination communication device of the first MAC SDU is not the first communication device.

5. The method of claim 4, wherein transmitting the second data comprises:

multiplexing the first data and a third data into the second data, wherein the first data and the third data are received from different logical channels, and the destination communication device of the third data is the same as the destination communication device of the first MAC SDU.

6. The method of claim 5, wherein multiplexing the first data and the third data comprises:

encoding the first data into a second MAC SDU of a second MAC PDU, wherein a second MAC sub-header corresponding to the second MAC SDU comprises a source field indicating an identity of a source communication device of the first data and a destination field indicating an identity of a destination communication device of the first data; and encoding the third data into a third MAC SDU of the second MAC PDU, wherein a third MAC sub-header corresponding to the second MAC SDU comprises a source field indicating an identity of a source communication device of the third data and a destination field indicating an identity of the destination communication device of the first data.

7. The method of claim 6, wherein the source communication device of the first data is different from the source communication device of the third data.

8. The method of claim 4, wherein the second data comprises second sidelink control information, and the second sidelink control information comprises a source field indicating the identity of the first communication device.

9. The method of claim 1, further comprising:

decoding the first data into a first medium access control (MAC) protocol data unit (PDU), wherein the first MAC PDU comprises a first MAC header including a destination field indicating the identity of the first UE.

10. The method of claim 9, further comprising:

decoding the first MAC PDU into a first Adaptation (ADAP) PDU, wherein a first ADAP header of the first ADAP PDU comprises a source field indicating an identity of the second UE and a destination field indicating an identity of a destination communication device.

11. The method of claim 10, further comprising:

transmitting a second data associated with the first data to the destination communication device when the destination communication device is not the first UE.

12. The method of claim 11, wherein transmitting the second data comprises:

multiplexing the first data and a third data into the second data, wherein the destination communication device of the third data is the same as the destination communication device of the first ADAP PDU.

13. The method of claim 12, wherein multiplexing the first data and the third data comprises:

encoding the first data into a second ADAP PDU, wherein a second ADAP header of the second ADAP PDU comprises a source field indicating an identity of the second UE and a destination field indicating an identity of the destination communication device; and encoding the third data into a third ADAP PDU, wherein a third ADAP header of the third ADAP PDU comprises a source field indicating an identity of a third UE and a destination field indicating an identity of the destination communication device.

14. The method of claim 13, wherein the third UE is different from the second UE.

15. The method of claim 13, wherein multiplexing the first data and the third data comprises:

encoding the second ADAP PDU and the third ADAP PDU into a second MAC PDU, wherein a header of the second MAC PDU comprises a source field indicating an identity of the first UE.

16. The method of claim 15, wherein transmitting the second data comprises:

encoding the second MAC PDU into the second data, wherein the second data comprises second sidelink control information, and the second sidelink control information comprises a source field indicating the identity of the first UE.

17. The method of claim 16, wherein the source field of the second sidelink control information comprises at least a part the identity of the first UE.

18. A user equipment (UE), comprising:

at least one memory; and at least one processor coupled with the at least one memory and configured to cause the UE to:

receive a first data from a second UE, wherein the first data comprises first sidelink control information, and the first sidelink control information comprises a destination field indicating an identity of the first UE; and decode the first data into a first medium access control (MAC) protocol data unit (PDU), wherein:

the first MAC PDU comprises a destination field indicating the identity of the first UE;

the destination field of the first sidelink control information comprises a part of the identity of the first UE; and the destination field of the first MAC PDU comprises the remaining part of the identity of the first UE.

* * * * *